(12) United States Patent
Chong et al.

(10) Patent No.: US 7,953,848 B2
(45) Date of Patent: *May 31, 2011

(54) PROBLEM DETERMINATION IN DISTRIBUTED ENTERPRISE APPLICATIONS

(75) Inventors: James C. Chong, Orinda, CA (US); Joseph L. Chan, Lafayette, CA (US); Tushar M. Patel, San Francisco, CA (US); Jean-Jacques Heler, Palo Alto, CA (US); Chi Hong So, Pleasant Hill, CA (US); Arthur Tsang, Walnut Creek, CA (US); Robert S. Lam, Oakland, CA (US); Raymond Chow, San Ramon, CA (US); Henry Tsang, Walnut Creek, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/108,469

(22) Filed: Apr. 23, 2008
(Under 37 CFR 1.47)

(65) Prior Publication Data

US 2008/0201642 A1  Aug. 21, 2008

Related U.S. Application Data

(63) Continuation of application No. 10/409,415, filed on Apr. 8, 2003, now Pat. No. 7,383,332.

(60) Provisional application No. 60/371,035, filed on Apr. 8, 2002.

(51) Int. Cl.
*G06F 15/173* (2006.01)
(52) U.S. Cl. ....................................................... 709/224
(58) Field of Classification Search .................. 709/217, 709/223–226; 718/104
See application file for complete search history.

(56) References Cited

U.S. PATENT DOCUMENTS 5,941,947 A    8/1999 Brown et al.
(Continued)

FOREIGN PATENT DOCUMENTS

CN    1238495    12/1999
(Continued)

OTHER PUBLICATIONS

Abstract for CN1238495A, published Dec. 15, 1999, 1 p [Abstract for corresponding case EP0957432A2].

(Continued)

*Primary Examiner* — Joseph E Avellino
*Assistant Examiner* — Chirag Patel
(74) *Attorney, Agent, or Firm* — Janaki K. Davda; Konrad Raynes Victor LLP

(57) ABSTRACT

Problem determination is provided in an enterprise computer system in a distributed environment. Information is obtained regarding the enterprise applications, and high-level information is presented to a user, with one or more prompts are provided to the user for more detailed information. In response to a request from a user for more detailed information about the application, more detailed information is provided to the user. Several levels of more detailed information about applications, including information as to individual threads, is available. The problem determination also includes receiving instructions from an administrator to establish an account for a user, associating one or more servers with the account, and providing access to the corresponding user only to the associated servers. Searches may be conducted for strings and requests, and identified strings and requests may be sorted by a variety of criteria.

22 Claims, 32 Drawing Sheets

U.S. PATENT DOCUMENTS

| | | | |
|---|---|---|---|
| 5,958,010 | A | 9/1999 | Agarwal et al. |
| 6,031,528 | A | 2/2000 | Langfahl, Jr. |
| 6,119,101 | A | 9/2000 | Peckover |
| 6,321,263 | B1 | 11/2001 | Luzzi et al. |
| 6,438,573 | B1 | 8/2002 | Nilsen |
| 6,446,028 | B1 | 9/2002 | Wang |
| 6,470,383 | B1 | 10/2002 | Leshem et al. |
| 6,633,908 | B1 | 10/2003 | Leymann et al. |
| 6,658,471 | B1 | 12/2003 | Berry et al. |
| 6,701,363 | B1 | 3/2004 | Chiu et al. |
| 6,711,739 | B1 | 3/2004 | Kutcher |
| 6,785,728 | B1 | 8/2004 | Schneider et al. |
| 7,127,743 | B1 | 10/2006 | Khanolkar et al. |
| 7,272,613 | B2 | 9/2007 | Sim et al. |
| 7,277,938 | B2 | 10/2007 | Duimovich et al. |
| 7,383,332 | B2 * | 6/2008 | Chong et al. .......... 709/224 |
| 7,415,537 | B1 | 8/2008 | Maes |
| 2001/0034771 | A1 | 10/2001 | Hutsch et al. |
| 2002/0038331 | A1 | 3/2002 | Flavin |
| 2002/0042896 | A1 | 4/2002 | Johnson et al. |
| 2002/0054169 | A1 | 5/2002 | Richardson |
| 2002/0054269 | A1 | 5/2002 | Maeda et al. |
| 2002/0054587 | A1 | 5/2002 | Baker et al. |
| 2002/0120663 | A1 | 8/2002 | Binns |
| 2002/0120727 | A1 | 8/2002 | Curley et al. |
| 2003/0004987 | A1 | 1/2003 | Glanzer et al. |
| 2003/0014464 | A1 | 1/2003 | Deverill et al. |
| 2003/0065764 | A1 | 4/2003 | Capers et al. |
| 2003/0115509 | A1 | 6/2003 | Dubal |
| 2003/0182463 | A1 | 9/2003 | Valk |
| 2004/0054984 | A1 | 3/2004 | Chong et al. |
| 2004/0064552 | A1 | 4/2004 | Chong et al. |
| 2004/0226013 | A1 | 11/2004 | Mariotti et al. |
| 2005/0165755 | A1 | 7/2005 | Chan |
| 2006/0167929 | A1 | 7/2006 | Chakraborty et al. |
| 2007/0156669 | A1 | 7/2007 | Marchisio et al. |
| 2007/0294660 | A1 | 12/2007 | Chong et al. |

FOREIGN PATENT DOCUMENTS

| | | | |
|---|---|---|---|
| EP | 0957432 | A2 | 11/1999 |
| EP | 1134658 | | 9/2001 |
| JP | 7129438 | | 5/1995 |
| JP | 2000122943 | | 4/2000 |
| JP | 2000222255 | | 8/2000 |
| JP | 2000242530 | | 9/2000 |
| JP | 2000250833 | | 9/2000 |
| JP | 2000315198 | | 11/2000 |
| JP | 2002041331 | | 2/2002 |
| JP | 2002082926 | | 3/2002 |
| JP | 2002099448 | | 4/2002 |
| KR | 2001-0079612 | | 8/2001 |
| WO | 99/15950 | | 4/1999 |
| WO | 00/08806 | | 2/2000 |
| WO | 03/087982 | | 10/2003 |

OTHER PUBLICATIONS

Abstract and Machine Translation for JP2002082926, published on Mar. 22, 2002, 36 pp.
Abstract and Machine Translation for JP7129438, published on May 19, 1995, 22 pp.
Abstract and Machine Translation for JP2002099448, published on Apr. 5, 2002, 28 pp.
Abstract and Machine Translation for JP2000122943, published on Apr. 28, 2000, 77 pp.
Abstract and Machine Translation for JP2002041331, published on Feb. 8, 2002, 8 pp.
Abstract and Machine Translation for JP2000315198, published on Nov. 14, 2000, 42 pp.
Abstract and Machine Translation for JP2000250833, published on Sep. 14, 2000, 17 pp.
Chinese Office Action & Translation, Oct. 30, 2009, for Application No. 038148773, 11 pp.
IDS Report, Sep. 30, 2009, from the Sep. 15, 2009 Office Action for JP2004-516267, 1 p.
Japanese Office Action & Translation, Sep. 15, 2009, for Application No. JP2004-516267, 5 pp.
Nikkei Internet Technology, "Four Points Essential for Making Web Applications Succeed", Nikkei Internet Technologies, Nikkei Business Publications, Inc., Oct. 22, 2001, Issue 52, 10 pp [in Japanese & English Abstract].
Shirato, D., "Evaluation of Application Types, and Providing Highly Effective Responses", Nikkei Open System, Nikkei Business Publications, Inc., Mar. 15, 2002, Issue 108, 10 pp [in Japanese & English Abstract].
Shirato, D., "Selecting Appropriate Functions for Performance, Operation, and Implementation Cost Requirements", Nikkei Open System, Nikkei Business Publications, Inc., Oct. 15, 2001, Issue 103, 10 pp [in Japanese & English Abstract].
Japanese First Office Action dated Mar. 25, 2008, for U.S. Appl. No. 10/409,415, 2 pp.
Japanese Second Office Action dated Aug. 1, 2008, for U.S. Appl. No. 10/409,415, 1 p.
Final Office Action 1, Dec. 31, 2007, for U.S. Appl. No. 10/606,028, Total 25 pp.
Final Office Action 1, Aug. 19, 2009, for U.S. Appl. No. 11/847,217, Total 12 pp.
Final Office Action 1, May 23, 2008, for U.S. Appl. No. 10/919,674, Total 17 pp.
Notice of Allowance 1, Jun. 26, 2008, for U.S. Appl. No. 10/606,028, Total 15 pp.
Notice of Allowance 1, Nov. 19, 2008, for U.S. Appl. No. 10/919,674, Total 4 pp.
Notice of Allowance 1, May 18, 2009, for U.S. Appl. No. 12/235,545, Total 28 pp.
Notice of Allowance 2, Dec. 2, 2008, for U.S. Appl. No. 10/606,028, Total 22 pp.
Notice of Allowance 2, May 5, 2009, for U.S. Appl. No. 10/919,674, Total 13 pp.
Notice of Allowance 3, Oct. 15, 2009, for U.S. Appl. No. 10/606,028, Total 7 pp.
Notice of Allowance 3, Oct. 19, 2009, for U.S. Appl. No. 10/919,674, Total 8 pp.
Notice of Allowance 4, Jan. 29, 2010, for U.S. Appl. No. 10/606,028, Total 16 pp.
Notice of Allowance 4, Jan. 29, 2010, for U.S. Appl. No. 10/919,674, Total 10 pp.
Office Action 1, Jun. 5, 2007, for U.S. Appl. No. 10/606,028, Total 17 pp.
Office Action 1, Feb. 26, 2009, for U.S. Appl. No. 11/847,217, Total 24 pp.
Office Action 1, Nov. 15, 2007, for U.S. Appl. No. 10/919,674, Total 20 pp.
Office Action 3, Feb. 3, 2010, for U.S. Appl. No. 11/847,217, Total 16 pp.
Supplemental Notice of Allowance, Sep. 26, 2008, for U.S. Appl. No. 10/606,028, Total 6 pp.
Supplemental Notice of Allowability, Jun. 8, 2009, for U.S. Appl. No. 12/235,545, Total 11 pp.
Final Office Action 1, May 18, 2007, for U.S. Appl. No. 10/409,415, Total 18 pp.
Notice of Allowance 1, Oct. 16, 2007, for U.S. Appl. No. 10/409,415, Total 14 pp.
Notice of Allowance 2, Nov. 20, 2007, for U.S. Appl. No. 10/409,415, Total 10 pp.
Notice of Allowance 3, Jan. 28, 2008, for U.S. Appl. No. 10/409,415, Total 10 pp.
Office Action 1, Dec. 7, 2006, for U.S. Appl. No. 10/409,415, Total 11 pp.
Translation for Japanese First Office Action dated Mar. 25, 2008, for U.S. Appl. No. 10/409,415, 2 pp.
Japanese First Office Action dated Mar. 25, 2008, for U.S. Appl. No. 10/409,415, 4 pp.
Translation for Japanese Second Office Action dated Aug. 1, 2008, for U.S. Appl. No. 10/409,415, 1 p.
Japanese Second Office Action dated Aug. 1, 2008, for U.S. Appl. No. 10/409,415, 3 pp.
Bauer et al., "Reference Architecture for Distributed Systems Management", IBM Systems Journal, 1994, vol. 33, pp. 426-444.

PCT International Preliminary Examination Report IPRP), Oct. 17, 2006, for International Application No. PCT/US04/26597, 10 pp.

PCT International Search Report, Nov. 24, 2004, for International Application No. PCT/US03/20109, 6 pp.

PCT International Preliminary Examination Report, Feb. 17, 2005, for International Application No. PCT/US03/20109, 4 pp.

PCT International Search Report or the Declaration, Oct. 23, 2003, for International Application No. PCT/US03/10459, 6 pp.

PCT International Search Report & Written Opinion, Jun. 7, 2005, for International Application No. PCT/US04/26597, 5 pp.

Supplementary European Search Report, Jan. 17, 2006, for International Application No. PCT/US03/20109, 6 pp.

PCT Response to Written Opinion and Request for Correction of Description of Drawings, Aug. 5, 2005, for International Application No. PCT/US04/26597., 5 pp.

Patent Abstract for KR2001-007912, published on Aug. 22, 2001, 1 pg.

Response to Written Opinion and Request for Correction of Description of Drawings, Apr. 11, 2005, for International Application No. PCT/US04/26597, 41 pp.

U.S. Appl. No. 12/235,545, filed Sep. 22, 2008, entitled "System and Computer Program for Monitoring Performance of Applications in Distributed Environment", invented by J.C. Chong, J.L. Chan, T.M. Patel, J. Heler, C.H. So, A. Tsang, R.S. Lam, R. Chow, H. Tang, J. Banks, and C.M. Zychowski, 50 pp.

U.S. Appl. No. 12/236,461, filed Sep. 23, 2008, entitled "Method, System, and Computer Program for Monitoring Performance of Applications in a Distributed Environment", invented by J.C. Chong, J.L. Chan, T.M. Patel, J. Heler, C.H. So, A. Tsang, R.S. Lam, R. Chow, J.D. Banks, C.M. Zychowski, and H. Tang, 48 pp.

Supplementary European Search Report, Oct. 27, 2008, for EP03718216.9, 3 pp.

Final Office Action 1, Dec. 30, 2010, for U.S. Appl. No. 12/236,461, Total 12 pp.

English Abstract and Machine Translation for JP2000222255, published on Aug. 11, 2000, Total 16 pp.

English Abstract and Machine Translation for JP2000242530, published on Sep. 8, 2000, Total 9 pp.

IDS Report, Jun. 8, 2010, from the Jun. 1, 2010 Office Action, Total 1 p.

NOA 1, Jun. 1, 2010, for U.S. Appl. No. 11/847,217, Total 10 pp.

NOA5, May 18, 2010, for U.S. Appl. No. 10/606,028, Total 7 pp.

Notice of Allowance 6, Aug. 27, 2010, for U.S. Appl. No. 10/606,028, 8 pp.

Office Action 1, Jun. 28, 2010, for U.S. Appl. No. 12/236,461, Total 39 pp.

\* cited by examiner

|  | ADMINISTRATION | AVAILABILITY | PROBLEM DETERMINATION | PERFORMANCE MANAGEMENT | LOGOUT | HELP |

REQUEST DETAIL
The Request Detail page provides data for one thread only. Use the tool to trace a stack, method or request and session object. If necessary, cancel a thread, cancel a request, or change the thread's priority or status.

SNAPSHOT DATE: Mar 22, 2002  APPLICATION SERVER NAME: Default Server
SNAPSHOT TIME: 10:35:41 AM  APPLICATION SERVER IP ADDRESS: 192.163.3.39
PLATFORM CPU % UTILIZATION: 0.78%  TOTAL THREAD COUNT: 2

REQUEST DETAIL

THREAD ID: 633246872
CLIENT REQUEST: com/qa/test/servlets/TestThreadKill
CLIENT REQUEST START DATE: Mar 22, 2002
CLIENT REQUEST START TIME: 10:20:34 AM
RESIDENT TIME: 908467 ms
PRIORITY: 5
CHANGE PRIORITY: [No Change ▼]

ACCUMULATED CPU: 0 μs
IDLE TIME: 908467 ms
THREAD TYPE: HttpServlet
CLASS NAME: Com/qa/test/servlets/TestThreadKill
CURRENT METHOD: ProcessRequest
THREAD STATUS: Waiting Condition
CHANGE THREAD STATUS: [No Change ▼] — 810

[Cancel Request] [Cancel Thread]
[Cancel] [Save]

MENU — 825
- Select New Thread
- Thread Detail
- Stack Trace
- Method Trace
- Request/Session Object 800, 805, 815, 820

| ADMINISTRATION | AVAILABILITY | PROBLEM DETERMINATION | PERFORMANCE MANAGEMENT | LOGOUT | HELP |

APPLICATION REQUEST SEARCH
Type in the request you want to search for in the Search Request Box. A client makes a request to a particular server resource. This resource is often a Web page or a Java application. If you leave the Search Request Box empty, all active requests will display.

GROUP: [App Group 2 Default Serv ▼]
SERVER: [qaapp-win-s01*Default Server ▼]
SEARCH REQUEST: [ ▼] [ OK ]
TIMESTAMP: Mar/21/2022 12:18:30

| SERVER NAME | | CLIENT REQUEST 1310 | START DATE/TIME 1315 | THREAD ID 1320 | TOTAL RESIDENT TIME 1325 |
|---|---|---|---|---|---|
| Artemis | AAD | Login jsp?Name=value&name=value | 04.15/02 00:18:31 | 02 | 47 |
| Athens | AAD | Login jsp?Name=value&name=value | 04.15/02 00:18:31 | 03 | 47 |

|  | ADMINISTRATION | AVAILABILITY | PROBLEM DETERMINATION | PERFORMANCE MANAGEMENT | LOGOUT | HELP |

THREAD POOLS SUMMARY
The Thread Pools Summary page reports information for the thread pools that the application server uses to process reports.

SERVER NAME qaspp-win-s01:Default Server

THREAD POOL SUMMARY DATA

| Thread Pool | Thread Creates | Thread Destroys | Active Threads | Pool Size | % Max |
|---|---|---|---|---|---|
| ORB thread pool | 2 | 0 | 1 | 2 | 0 |
| Servlet Engine Transports | 25 | 0 | 0 | 24 | 0 |

TIMESTAMP OF DETAIL SNAPSHOT: Thu Mar 21 16:16:16 PST 2002

MENU
- Overview
- EJBs
- Database Conn. Pools
- Servlet/Session Manager
- Thread Pools
- Transactions
- Web Applications
- Configure

| ADMINISTRATION | AVAILABILITY | PROBLEM DETERMINATION | PERFORMANCE MANAGEMENT | LOGOUT | HELP |

DATA COLLECTOR CONFIGURATION
Use the Data Collector Configuration page to register the data collector's configuration. Submit the configuration information by clicking Save.

ADMIN SERVER          APPLICATION SERVER        LISTEN PORT #
qaapp-win-s01         qabld                     9125

ENABLED
YES

CLASSNAME FILTER LIST (EXCLUDE)

com.cyanea.*, javax.*, oracle.*, sun.*, java.*, com.sun.*, com.ibm.*, weblogic.*
,COM.rsa.*, org.w3c.*, org.omg.*, org.xml.*com.beasys.*,utils.version.*,org
.apache.*

— 2405

CLASSNAME FILTER LIST (EXCLUDE OVERRIDE)

— 2410

[Cancel] [Save]

FIG. 24

PROBLEM DETERMINATION IN DISTRIBUTED ENTERPRISE APPLICATIONS

RELATED APPLICATIONS

This application is a continuation of and claims the benefit of U.S. Pat. No. 7,383,332, issued Jun. 3, 2008, having application Ser. No. 10/409,415, filed on Apr. 8, 2003, which claims the benefit of U.S. Provisional Patent Application 60/371,035 filed on Apr. 8, 2002, the disclosure of each of which is incorporated herein by reference in its entirety.

FIELD OF INVENTION

This invention relates to computer software, particularly distributed enterprise applications.

BACKGROUND OF THE INVENTION

Until recently corporations considered the mid-tier platform, based on such operating systems as Unix and Windows NT, too fragile for hosting mission critical applications for their businesses. With the introduction of Java® by Sun Microsystems, Inc., and the widespread use of the Internet to do business, the situation changed. Corporations now use the technologies based on Sun Microsystems Java 2 Enterprise Edition (J2EE) and build critical business applications on the mid-tier platform. Such applications are generally run in a distributed computing environment, with server farms having numerous CPU's.

Since many corporations do business with their customers using the Internet, critical business applications are now exposed to end-users through their browsers. Any downtime or problem with these online applications creates huge direct and indirect opportunity costs. One analyst has stated that a web site must respond within eight seconds or a user will leave and go to a competitor's web site. By one estimate, about $4.35 billion in online sales are lost each year in the U.S. alone due to downtime or slow sites.

A plethora of system management tools are available to monitor the performance of networks, databases, storage devices, and platforms, which together constitute the infrastructure of mission critical business applications. These tools are certainly necessary and have their place in the picture; however, the application connects all of those resources, and it is the performance of the application that directly affects the customer. The application drives the network traffic, database usage, and the platform workload. Consequently, most Internet website outages are application related, and existing system management tools fall short of giving any insight of how applications are behaving. Current off-the-shelf application management systems concentrate mainly on application server functions, and not on applications.

As many applications are directly exposed to customers twenty-four hours a day on the web, stringent availability and performance requirements are imposed. Currently, a data center typically resolves server problems by recycling the troubled application server. Unfortunately, recycling is typically only a temporary solution, as the error almost always reoccurs. The inability to identify a better resolution is due to the lack of production-class non-intrusive tools to service and troubleshoot faulty systems and applications on the mid-tier platform.

Another application management issue is due to the problems created by servicing the production workload. A clear division of labor between development activities and production services activities is a norm in enterprise IT organizations. However a major disconnect exists between data center operations and systems development activities. There is a lack of non-invasive tools that allow administrators to visualize the workload running inside the application server. Diagnosis without any J2EE context, passed from production services staff to development staff, is too low-level to offer developers any problem-solving hints.

Any application level tracing inherently involves high overhead and for this reason is not acceptable to high volume systems. A wide variety of components need to be monitored for diagnostic purposes, including servlets, JSP, enterprise Java beans, objects, methods, SQL, sessions and context. The distributed servers are a major source for the intermittent problems.

Current application management products provide less than optimal functions to handle multiple, distributed applications in a real time fashion. While applications are being integrated, most current systems management products still look at discrete components. This approach makes application troubleshooting difficult, and root cause analysis almost impossible.

In summary, a variety of problems can occur in J2EE application server farms which hamper the performance of e-business applications. The most common of these problems are loops, slow processing, hang situations, stall situations, exception occurrences, intermittent problems, deadlocks, timeouts, API related problems, and memory leaks. Existing environment and trouble shooting monitors are not available for application servers in distributed environments.

SUMMARY OF THE INVENTION

A method for problem determination for enterprise applications running in a distributed environment includes the steps of obtaining information regarding the enterprise applications, presenting high level information selected from the obtained information, including items of information, to a user, providing to the user one or more prompts for more detailed information, receiving, in response to one of the prompts, a request from a user for more detailed information, and providing more detailed information to the user in response to the request.

A method for problem determination for enterprise applications running in a distributed environment on a plurality of servers includes the steps of receiving instructions from an administrator to establish an account for a user, associating one or more servers with the account, and providing access to the corresponding user only to the associated servers.

A method for problem determination and cure for enterprise applications running in a distributed environment includes the steps of identifying a thread running in the distributed environment, prompting the user the option of executing a soft kill of the thread, and, in response to a command to execute a soft kill, adding code that causes an exception to be thrown so that the request is canceled.

A method for problem determination for enterprise applications running in a distributed environment includes prompting a user to select an application server and a search string, searching for occurrences of the search string among all active URL strings for web requests and active class names for remote enterprise java bean requests, and displaying identified strings and requests.

A method for problem determination for enterprise applications running in a distributed environment includes prompting a user to enter an exclude list of class names of applications not to be monitored, prompting the user to enter an exclude override list of class names to be monitored, and upon receiving the requested information, monitoring all classes other than those classes identified in the exclude list and not in the exclude override list.

A method for problem determination for enterprise applications running in a distributed environment includes the steps of monitoring activity based availability of an application running on a server in the distributed environment, and displaying for the user an indication of whether the server is available or unavailable based on the activity based availability. The method may include monitoring one or more of the delta CPU usage, the delta throughput volume, and delta memory usage attributable to the application being monitored. If any of those values is below a threshold, the server is considered to be unavailable, notwithstanding the availability of the hardware.

A system for problem determination for enterprise applications running in a distributed environment includes computer hardware configured for obtaining information regarding the enterprise applications, for presenting high level information to a user, for providing to the user one or more prompts for more detailed information, for receiving, in response to one of the prompts, a request from a user for more detailed information, and for providing more detailed information to the user in response to the request.

A system for problem determination for enterprise applications running in a distributed environment on a plurality of servers includes computer hardware configured for receiving instructions from an administrator to establish an account for a user, for associating one or more servers with the account, and for providing access to the corresponding user only to the associated servers.

A system for problem determination and cure for enterprise applications running in a distributed environment includes computer hardware configured for identifying a thread running in the distributed environment, for prompting the user the option of executing a soft kill of the thread, and, in response to a command to execute a soft kill, for adding code that causes an exception to be thrown so that the request is canceled.

A system for problem determination for enterprise applications running in a distributed environment includes computer hardware configured for receiving a selection of an application server and a search string, for searching for occurrences of the search string among all active URL strings for web requests and active class names for remote enterprise java bean requests, and for displaying identified strings and requests.

A system for problem determination for enterprise applications running in a distributed environment includes computer hardware configured for prompting a user to enter an exclude list of class names of applications not to be monitored, for prompting the user to enter an exclude override list of class names to be monitored, and for, upon receiving the requested information, monitoring all classes other than those classes identified in the exclude list and not in the exclude override list.

A system for problem determination for enterprise applications running in a distributed environment includes computer hardware configured for monitoring activity based availability of an application running on a server in the distributed environment, and for displaying for the user an indication of whether the server is available or unavailable based on the activity based availability. The computer hardware may be configured for monitoring one or more of the delta CPU usage, the delta throughput volume, and delta memory usage attributable to the application being monitored. If any of those values is below a threshold, the server is considered to be unavailable, notwithstanding the availability of the hardware.

A computer program for problem determination for enterprise applications running in a distributed environment is made up of instructions stored on a medium, which instructions, when executed on a processor cause the processor to execute the steps of: presenting high level information, including information items, selected from the obtained information in a format accessible to a user, providing to the user one or more prompts to request more detailed information relative to one or more of the information items, receiving in response to one of said prompts a request from a user for more detailed information as to one or more of said information items, and providing the requested more detailed information to the user in response to the request.

A computer program for problem determination for enterprise applications running in a distributed environment, is made up of instructions stored on a medium, the instructions, when executed on a processor causing the processor to execute the steps of: receiving instructions from an administrator to establish an account for a user, associating one or more servers with the account, and providing access to the corresponding user only to the associated servers.

A computer program for problem determination and cure for enterprise applications running in a distributed environment is made up of instructions stored on a medium, which instructions, when executed on a processor cause the processor to execute the steps of: identifying a thread running in the environment, providing a user with an option to execute a soft kill of the thread, and, in response to a command to execute a soft kill, adding code to the thread that causes an exception to be thrown so that the thread is canceled.

A computer program for problem determination for enterprise applications running in a distributed environment is made up of instructions stored on a medium, which instructions, when executed on a processor, cause the processor to execute the steps of prompting a user to select an application server and a search inquiry, searching among all active URL strings for web requests and active class names for remote enterprise java bean requests responsive to the search inquiry, and displaying identified strings and requests.

A computer program for problem determination for enterprise applications running in a distributed environment is made up of instructions stored on a medium, which instructions, when executed on a processor, cause the processor to execute the steps of prompting the user to enter an exclude list of class names of applications not to be monitored, prompting the user to enter an exclude override list of class names to be monitored, and upon receiving the an exclude override list defining a subset of class names in the exclude list, monitoring all classes other than the classes identified in the exclude list and not identified in the exclude override list.

A computer program for problem determination for enterprise applications running in a distributed environment is made up of instructions stored on a medium, which instructions, when executed on a processor cause the processor to execute the steps of monitoring activity based availability of an application running on a server, and displaying for the user an indication of whether the server is available or unavailable based on the activity based availability.

BRIEF DESCRIPTION OF THE FIGURES

FIGS. 5-24 are exemplary screens in a user interface in accordance with the invention.

DETAILED DESCRIPTION OF EMBODIMENTS OF THE INVENTION

Figure 1A:
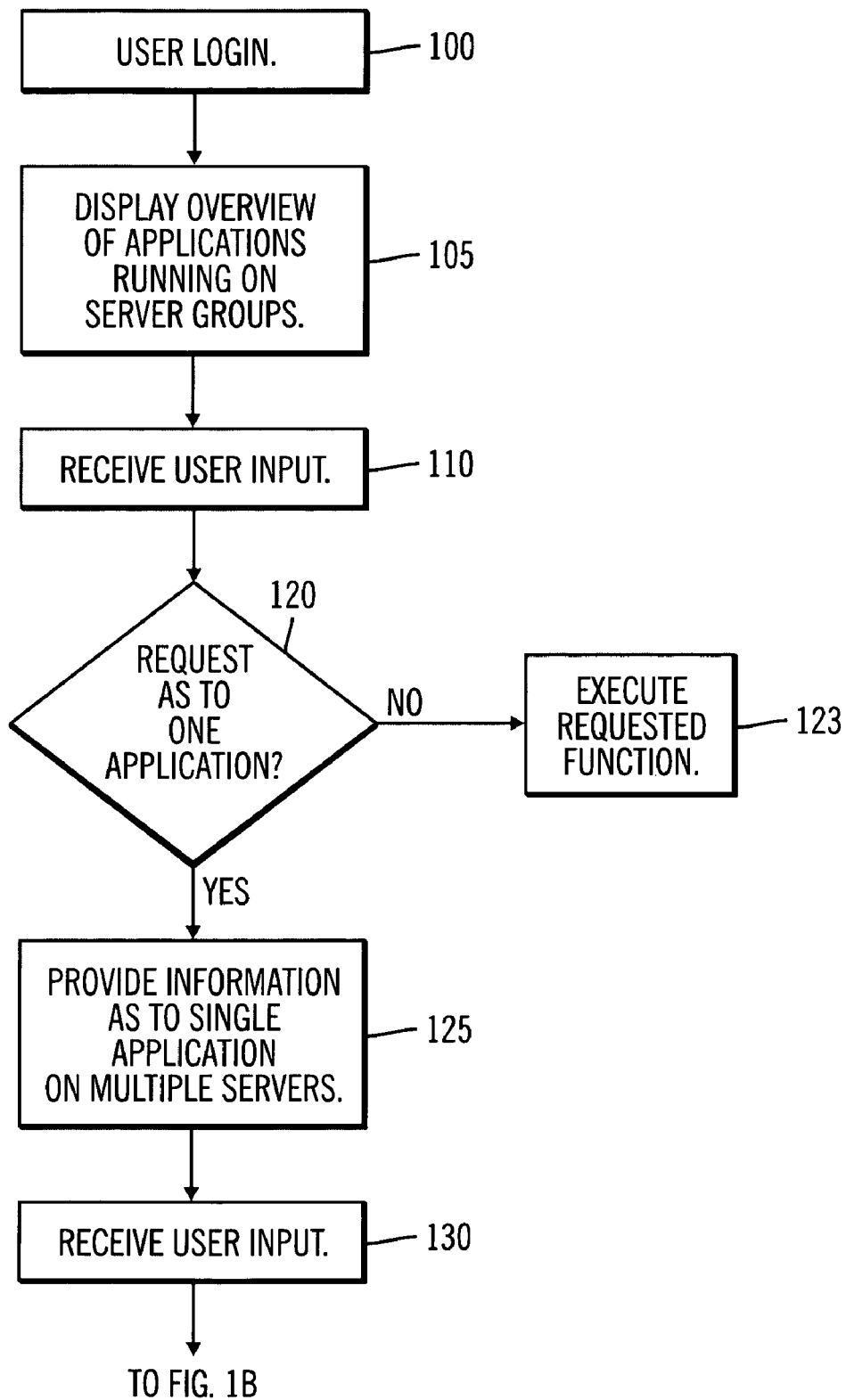
FIGS. 1A, 1B, 1C and 1D are a process flow diagram illustrating an exemplary process flow in accordance with the invention.

In a method and system of the invention, a method is provided to furnish information about the operation of servers and systems to a user. The method is particularly adapted to enterprise servers running systems based on the java programming system. The method is also particularly adapted to use on systems running multiple client-server applications on multiple servers.

In the method of the invention, a user is typically an information technology department representative who is asked to investigate user reports of problems. This process is described as problem determination. A large number of types of different problems may be encountered, including unavailability of a server to clients, slow processing of client requests, lack of response after submission of a request by a client, and other problems. In the initial step of the method, a user logs in and is presented with a user interface that furnishes the user with information. The information presents to the user, in response to an initial user request, is at a high level. This top level of information is also referred to as the application server groups level, because information about groups of application servers is provided. The computer system of the invention has selected this high level information for presentation to the user. The information may be understood as containing multiple items of information. The information provided contains information about the performance, either in real time or in the very recent past, such as in the last minute, or last five minutes, or last hour, of servers running the selected applications which the user is entitled to view. The user is provided with one or more options as to detailed information that may be provided. In particular, the options, or prompts, are to obtain more detailed information as to one or more of the presented items of information. The user selects one or more of the items for the display of more detailed information. In response to receipt of this user request, information is provided at a greater level of detail as to the one or more presented items. The user may accomplish this by, for example, mouse clicking on a hyperlink. For example, a feature of an item of information, such as a server name, may be hyperlinked. Many other manners of requesting the greater level of detail of information may be provided. The presentation of options for more detailed information may be understood as permitting the user to drill down to obtain greater levels of detail.

Information is provided with respect to applications, and not with respect to hardware or operating system function. Information provided at the top level includes information that affects clients directly. For example, clients see the processing of requests or transactions. Information provided at the top level preferably includes information as to numbers of transactions processed in a recent short time period. This information may be on an application server by application server basis, as well as for application server groups. For the user's reference, the same information may be provided in less recent time periods, so that the user may view trends in number of transactions or requests processed. Other information available includes statistical information, such as averages, for time to process requests or transactions. This information may be provided on a server-by-server basis, so as to isolate problems affecting one server. By providing information specific to applications, the user may relatively quickly use judgment to determine whether the problem is with the application, and where in the application the problem resides. The user may then use existing tools, not part of the method of the invention, to solve the problem. Alternatively, tools for solving certain types of problems may be incorporated in computer program and system implementing the method of the invention.

Displays of Application Information

Figure 5:
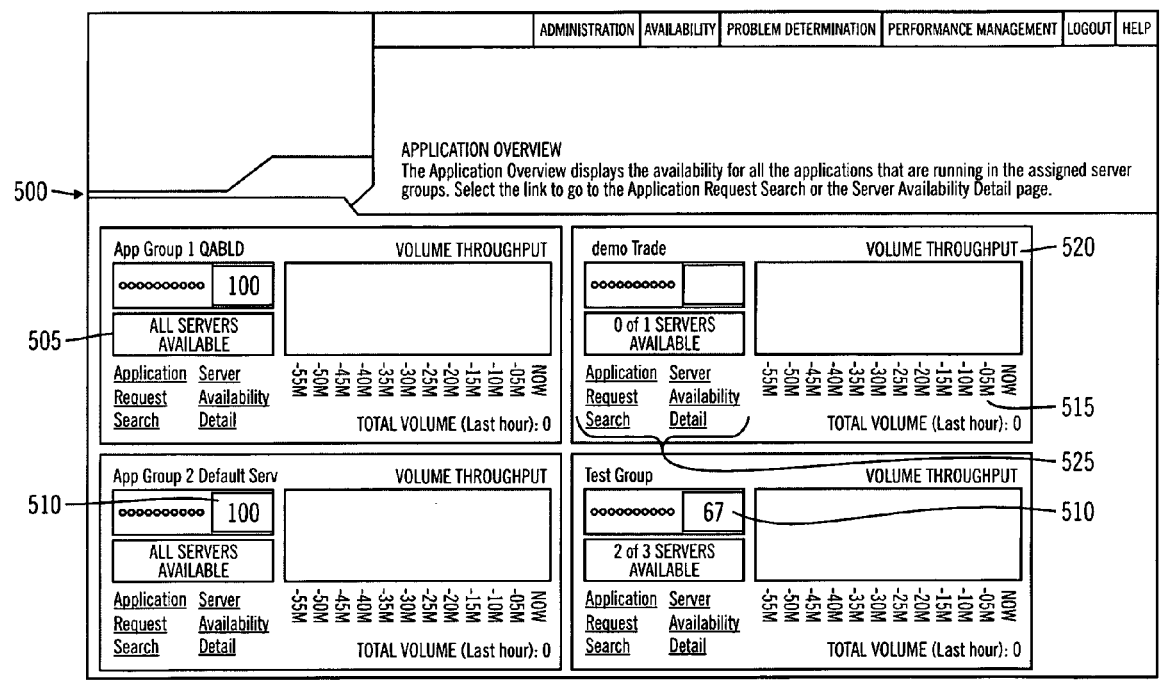

The method of the invention will now be explained by an example of a series of levels of provided information. It will be understood that such design features as the number of levels, the information furnished at each level, and the type of display, may be varied within the scope of the method of the invention. In this example, the highest level is the level of application server groups or the application overview page. An exemplary process flow will be discussed with reference to FIG. 1. As indicated by block 100, the user initially logs in. Upon user login, the method causes the application server groups or application overview page to be displayed, as indicated by block 105. An exemplary application overview page 500 is shown in FIG. 5. At the application server groups level, there may be provided to the user the following information. It will be indicated whether each server is available or unavailable, such as in the boxes at 505. The definition of available and unavailable used by the system will mean availability of the application software running on the server. Availability or unavailability is measured by monitoring of requests processed by the application. Availability or unavailability is preferably not determined by hardware availability or unavailability, or by sending a dummy request to the software. For ease of viewing, this information may be provided graphically. The ratio of available servers to total servers may be shown as a percentage, such as at the boxes 510. At the same display, information is provided as to the throughput of the application on each server group, such as at 515. Preferably, information is provided as to the number of completed requests over one or more recent time periods. In a preferred embodiment, as illustrated at 520, there is provided information as to number of completed requests over a selected number of recent time intervals. In a preferred embodiment, the number of completed requests over a number of recent time periods, such as the twelve most recent five-minute intervals, is provided, such as at boxes 515. The number of completed requests in each interval may be presented graphically for ease of review. The top level, or application server groups, display may also provide a total number of completed requests. By viewing this overview, the user will obtain useful information. For example, if a server has slowed or stopped providing completed requests, this will be immediately shown. If the volume of completed requests has been gradually increasing, for example because of a large number of requests by users, that will be immediately visible. The graphical display of throughput information will permit trends to be visible rapidly to the user.

Figure 6:
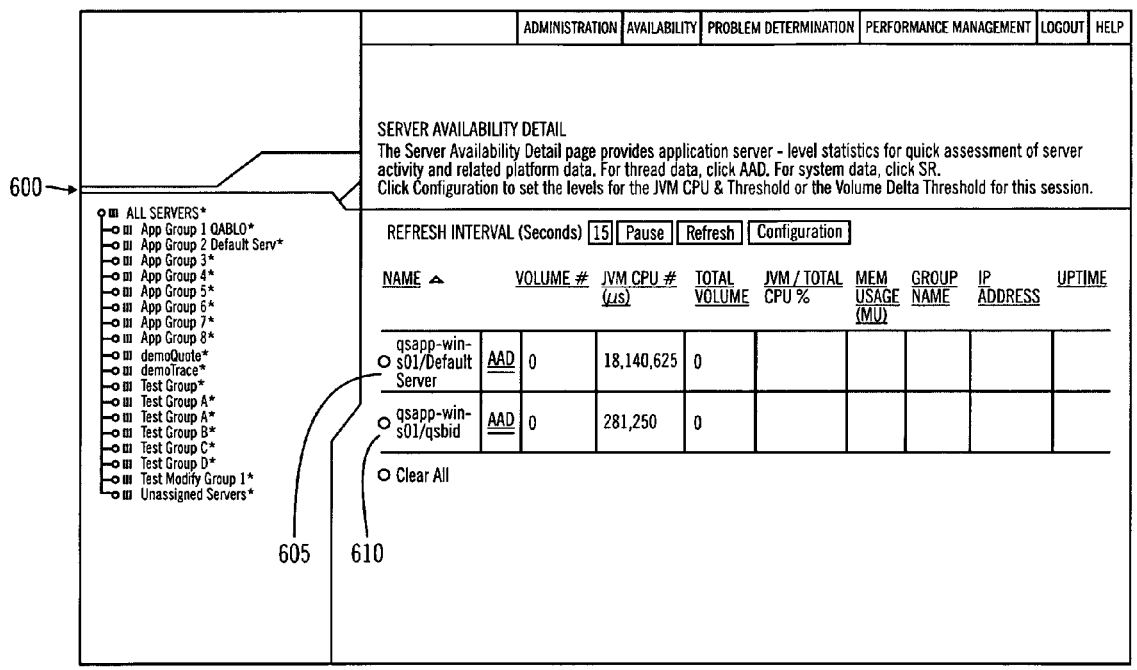

From the top level display, or application overview page, the user is presented with at least one means for activating a display of more detailed information about a displayed application. Hyperlinked text may be provided, such as at 525 in FIG. 5. In the method of the invention, user input is received. If the request is in the nature of a request for more detailed information regarding a single application, as indicated by decision block 120, then additional information is provided regarding the selected application. If the request is of another type, then the requested function is executed, as indicated at block 123. In the example where the top level is the application groups level, the next more detailed display level will be referred to as the application server group level or server availability detail page, as indicated by block 125. An example of an application server group level or server availability detail page is shown in FIG. 6 as 600. At the application server group level, information is provided about one selected application on a server-by-server basis, such as servers 605, 610, noted in FIG. 6. From the application groups level display, there is at least one selection associated with each displayed application. The selection may be a display providing additional detail about each server or java virtual machine (JVM) running the application, as illustrated in FIG. 6. Selected information is displayed with respect to each server. The information should identify the server, and include information indicating at least one of CPU usage and memory usage. In an example, the information includes the server name, and may include one or more of the following: the server's IP address, the server's start time, the server's accumulated uptime, the incremental JVM CPU usage, the server total CPU, the JVM CPU time (cumulated), the JVM CPU usage, the JVM memory usage, the JVM memory increment since the previous refresh, the total number of completed requests, and the incremental number of completed requests. This information may be displayed graphically, numerically, or both. Review of the application server group level information may immediately indicate to the user the source of a problem. For example, very high CPU usage by one server will indicate that the user needs to investigate further the operation of that one server. A low number of completed requests by some servers will indicate that those particular servers need to be investigated. If all servers have very similar information at this level, then the user will know to look elsewhere in the system for the source of a problem.

Figure 7:
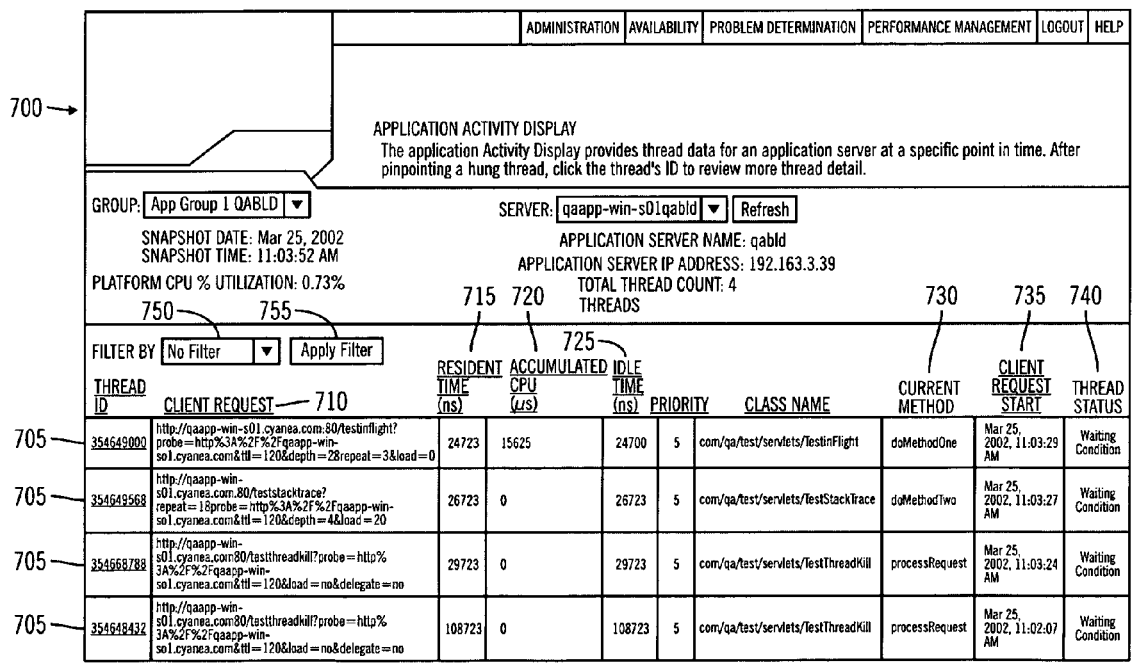

From the application group server level, the next level of detail is the application server level. The display of the application server level may be referred to as the application activity display. From the availability manager display, or the application group server view, there is preferably a selection available to move to the application server level associated with each displayed server. In the method, user input is received, as indicated by block 130. If the user input is in the nature of a request for additional information relating to a selected server, as indicated by decision block 135, then application server level information will be displayed, as indicated by block 140. If the user input is not a request for additional information relating to a selected server, then the requested function is executed, as indicated at block 137. The application server level will provide information as to each of the threads which is being executed by that server at a particular point in time, as shown, for example, as screen 700 in FIG. 7. This is a display of information on a thread-by-thread basis, with each row 705 providing information on a single thread. The point in time is recent, and may be the most recent information available to the system. The information displayed about the thread includes at least thread identification information, such as the client request at column 710, and information relating to the speed of execution of the thread and to the use of system resources by the thread. Such information related to speed of execution may include the time of the client request, the resident time, as in column 715, the accumulated CPU time, as in column 720, and the idle time, as in column 725. By viewing this information related to speed of execution, the user may be able to see immediately that one or more threads are not executing. Information related to the use of system resources may include accumulated CPU time. Such information as to the use of system resources may be useful in identifying a thread that is looping or for some other reason preventing other threads from gaining access to system resources. Information as to the current method being executed by the thread, as at column 730, the client request start time, as at column 735, and the thread status, as at column 740, may also be provided.

Figure 1B:
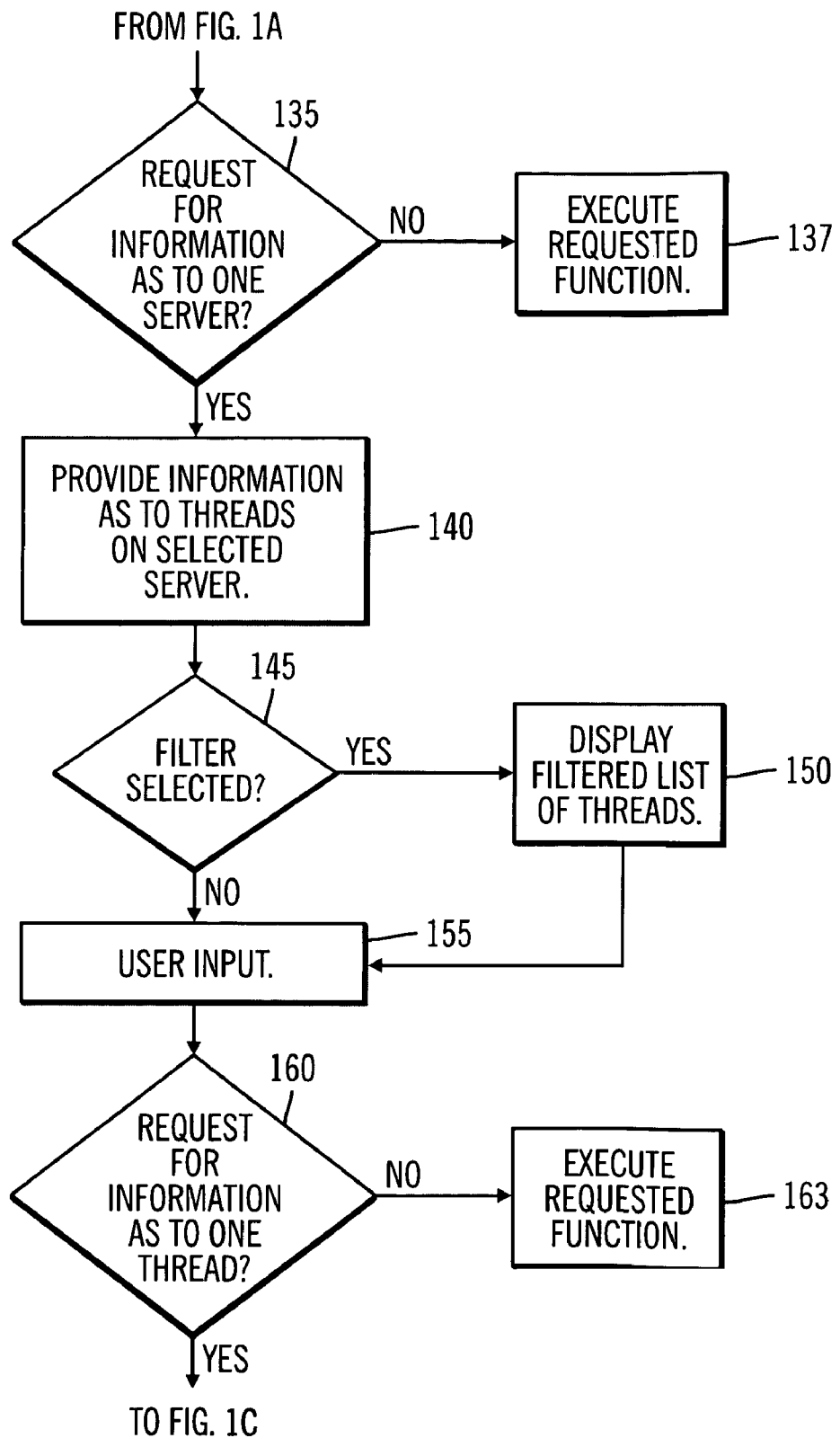

A filter may be provided to limit the number of threads selected for display. A filter has certain criteria relating to properties of threads. As indicated in FIG. 1B by decision block 145 and block 150, if a filter is activated, only those threads that meet the criteria of the filter are displayed. The filter may limit the display to those threads that meet threshold criteria in one or more selected types of speed of processing categories or use of system resource categories. For example, a filter may be configured so that only those threads that have a resident time above a certain threshold are selected. Threads that have a high resident time are likely to be perceived by clients as resulting in slow response. By way of further example, only those threads that have accumulated more than a threshold amount of CPU time may be displayed. This information can permit the user to identify those threads that may be looping or otherwise interfering with the processing of other threads. By way of example, a drop down menu of available filters may be provided, as indicated at 750, and the user may request application of a filter by use of a radio button as at 755.

Information furnished may also be in the nature of the type of request, such as the name of the request, the thread type, and the class name. Display of this request nature information may enable the user to identify a class of requests that are being processed differentially from other requests. For example, a financial services firm may permit clients to view account information and to initiate trades through its website. If trades are taking an excessively long period of time to complete, but requests to view account information are processed promptly, the request nature information will indicate this disparity. The thread information displayed may also include information as to the method currently being executed by the thread. This current method information may permit the user to identify a method which is taking an excessively long time to complete.

Figure 1C:
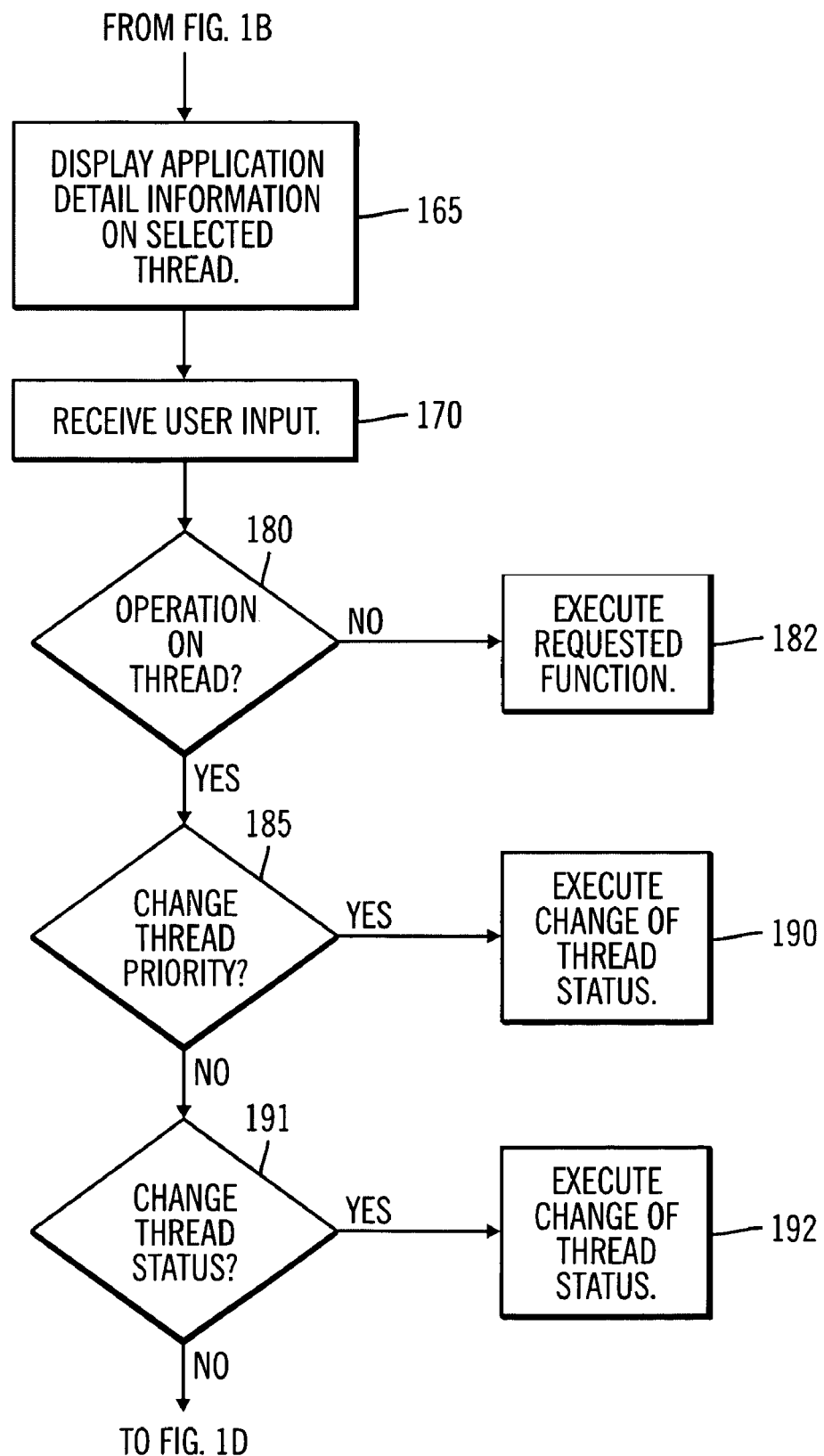

From the application activity display, the user may select to view more detailed information about a particular thread. The input from the user is received as indicated by block 155, and the related decision block is shown at block 160. If the request is not for information as to one thread, the requested function is executed, as shown by block 163. Referring to FIG. 1C, as shown by block 165, an application thread view is provided as to the selected thread. In an example, this information will be referred to as the application thread view, or the request detail page, and is illustrated as 800 in FIG. 8. The additional detailed information may include one or more of the elements discussed above, as well as the appropriate SQL statement. Preferably, additional information, including the session object, request object and stack trace, can be requested from this page.

Figure 1D:
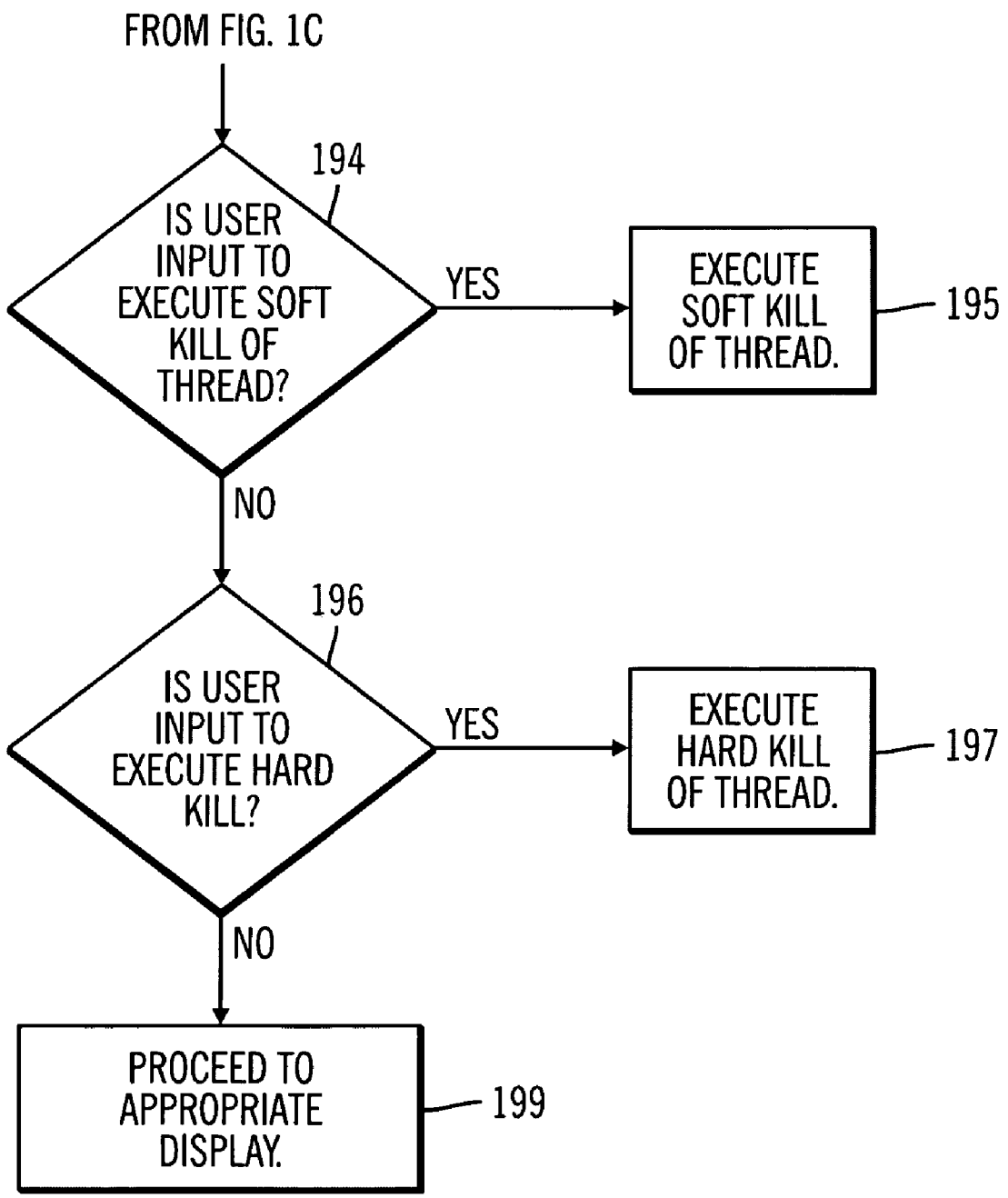

Tools may be provided for addressing problems after determination. For example, problem determination may result in identification of a particular thread that is looping. A display of detail, such as display 800, may include one or more buttons or links to activate one or more tools or operations. The tools or operations may be provided in addition to other displayed information. In one example, the user is provided a number of operations which may be carried out on the thread. These operations may include changing the priority of the thread, illustrated by drop down menu available at 805, changing the thread status, illustrated by a drop down menu available at 810, terminating the thread by a soft kill or a hard kill, or obtaining additional information, such as a method trace. The soft kill may be available by a radio button, such as at 815. The hard kill may be available by a radio button, such as at 820. A request for a method trace may be provided as one of a number of menu items, such as in menu 825. The soft kill of a thread may be accomplished by adding code that causes an exception to be thrown so that the thread is canceled. This may be done in real time through the JVMPI interface in the probe/publish engine (described below). The soft kill is preferable to a hard kill, as a hard kill of a thread may result in the need to restart the JVM. In an example, a user input may be evaluated to determine if an operation is requested, as indicated by block 180 of FIG. 1, otherwise a requested function is executed as indicated by block 182. If an operation is requested, then the process flow may optionally successively check the user input for requests for various operations. The process flow may check for a request for change in thread priority, as indicated at block 185, and change thread priority if a change is requested, as indicated by block 190. The process flow may check for a request for a change in thread status, and if such a request is identified, implement the request, as shown by blocks 191 and 192. Referring to FIG. 1D, the process flow may check for a request for a soft kill, as indicated by block 194. If a request for a soft kill is detected, then code is added as explained above, and noted at block 195. If a request for a hard kill is received, then the hard kill is executed, as indicated by blocks 196 and 197, otherwise processing proceeds to appropriate display, as indicated by block 199.

Figure 9:
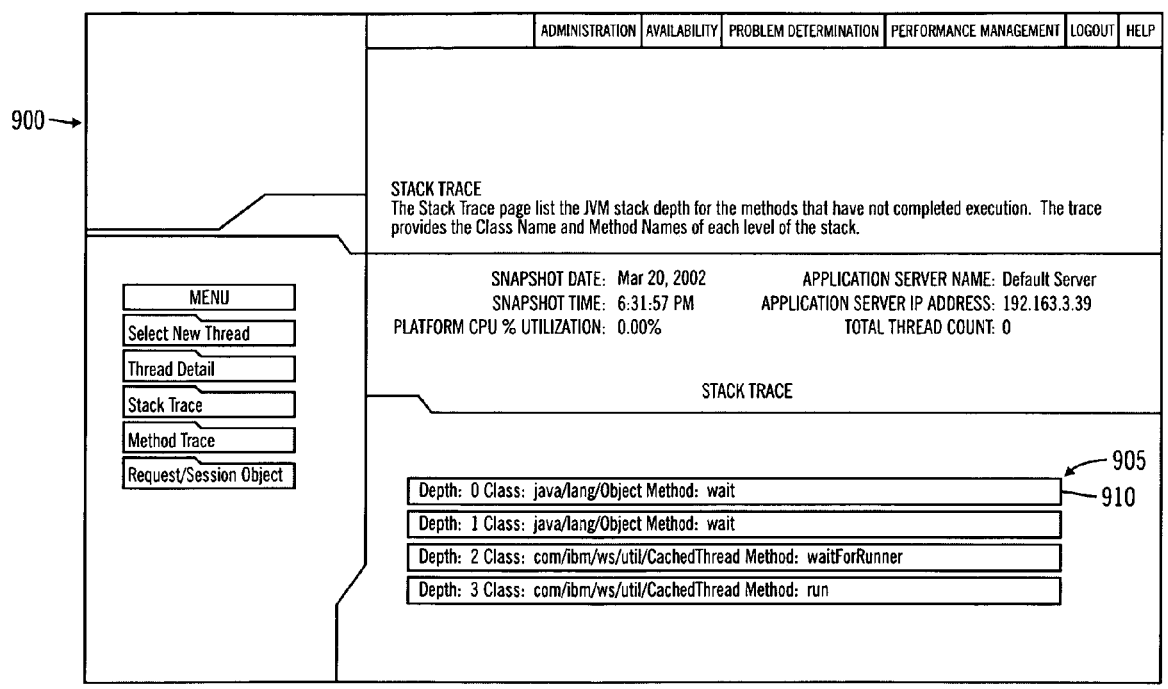

A further item of detail is the stack trace, which is illustrated as display 900 in FIG. 9. The stack trace displays a list of method calls, illustrated at 905, starting with the method where the stack trace printed; in this example, the method calls are in "last in first out" order. Thus, the last executed method, such as the method at 910, displays first in the stack trace.

Figure 10:
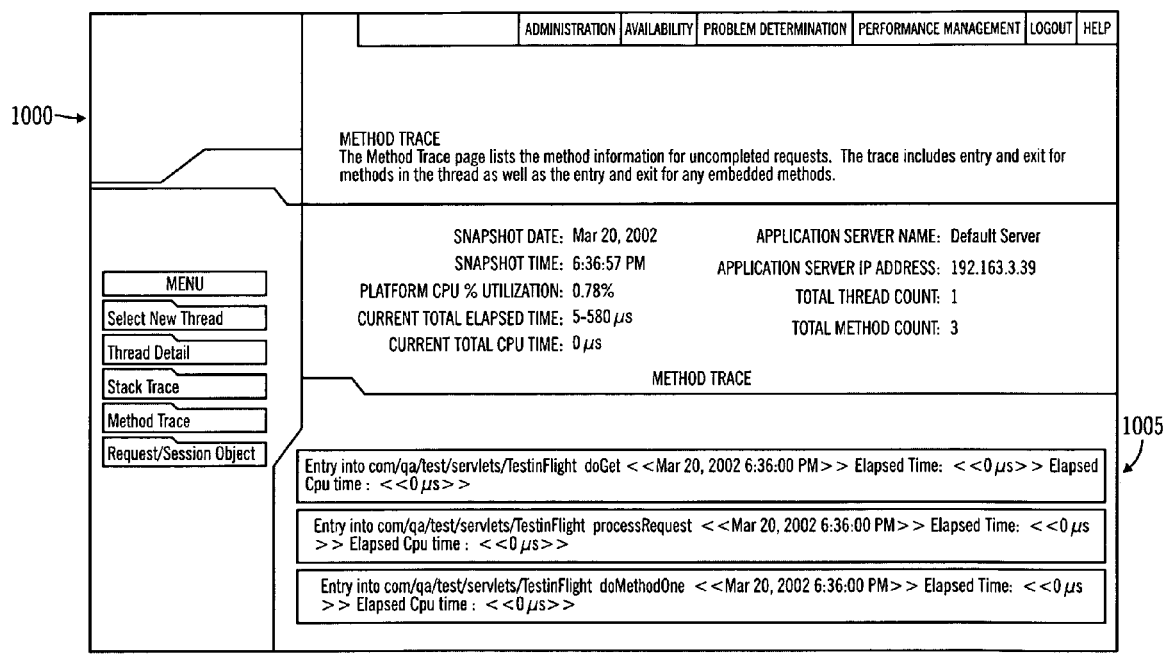

As noted above, a further level of detail is the display of the method trace, an example of which is shown as display 1000 at FIG. 10. The user may obtain the display of the method trace by submitting an input from the request detail page, such as by making a selection from menu 825. The method trace displays the entire execution history, an example of which is shown at 1005 in terms of the method trace of the request being processed by the thread, and preferably includes the SQL statement as well. The method trace display can assist a user to identify, for example, if a particular thread is looping.

Figure 11:
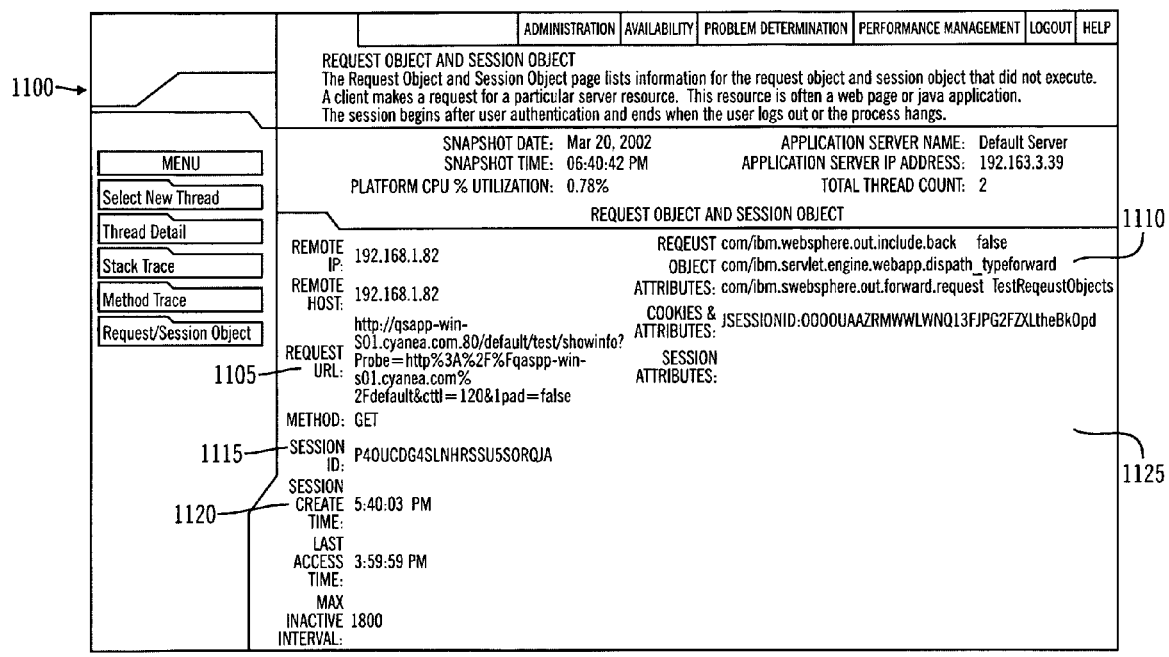

Information as to the current request object and session object, as illustrated as display 1100 in FIG. 11, may be obtained by request from the request detail page. The information as to the current request may include the URL of the request, as shown at 1105, attributes of the request object, as shown at 1110. Session object information may include a session identification, as shown at 1115, session create time, as shown at 1120, and session attributes, if any, at 1125.

Searching

Figure 2:
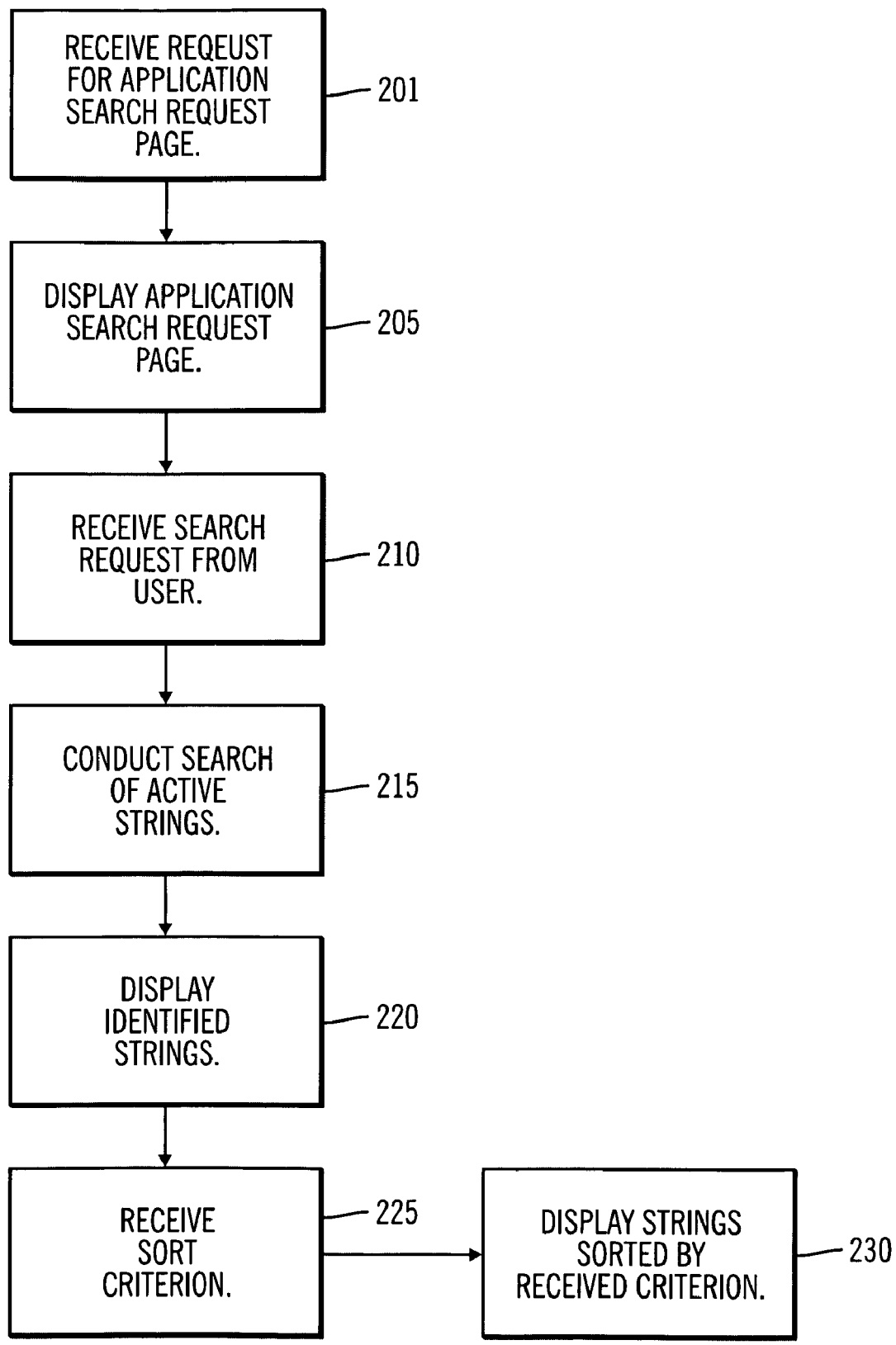
FIG. 2 is a process flow diagram illustrating an exemplary process flow in accordance with the invention.
Figure 12:
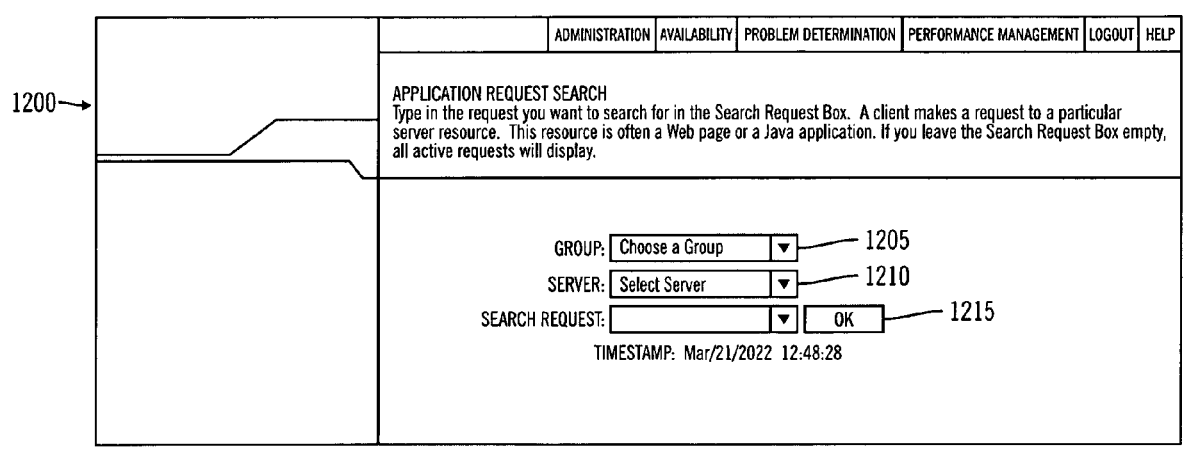

In the example above, each display provides a selection of one level of detail on a particular server group, server, or thread. In a preferred embodiment, multiple levels of detail may be made available. For example, at any level, the user may be provided the option to conduct a search. The process flow related to searching will be illustrated with respect to FIG. 2. As illustrated at block 201, a user request for an application request search page is received. After selecting this option, an application request search page, is displayed, as indicated by block 205. An example of an application request search page is shown, as display 1200, at FIG. 12. The application request search page prompts the user to select a group, such as with an available drop down menu at 1205, and a server, such as at 1210, for searching, and to enter search terms in the form of a text string, such as in window 1215. As indicated in the flow diagram at 210, the server designation and search terms are received from the user. The search term, in the form of a text string, is searched for all active URL strings for web requests and active class names for remote enterprise java bean requests, as indicated at block 215. A results page will display all identified URL strings or active enterprise java bean requests, as indicated in the flow diagram at block 220. An example of a search results page is shown as display 1300 in FIG. 13, with the results shown at 1305. Displayed information may include the server name for the result, as illustrated by column 1305, the client request name, as illustrated by column 1310, the start date and time, as indicated by column 1315, an identification of the thread, as indicated by column 1320, and total resource time, as indicated by column 1325. The user is presented with the ability to sort these search results. The sort criteria preferably include start time and total resident time. In the display of FIG. 13, the user may cause the results to be sorted by various criteria by selecting certain of the column headings. Thus, the results may be sorted by server name, client request, start date and time, and total resource time. Particularly sorting by start time and total resident time can permit the user to quickly see URL strings and requests that are stalled, looping or otherwise problematic. As indicated by block 225, a search criterion is received from the user. In response, as indicated by block 230, strings or requests are displayed sorted by the received criterion. A drop down menu or other list of suggested search terms may also be provided. This search option permits the user to proceed directly to a display of information pertaining to particular threads corresponding to the type of client request searched. The search option may be presented at any displayed screen.

A number of search options can be provided. The search strategies can preferably identify transactions by behavior. For example, the search may be directed to all transactions in the system that have been in the system for longer than a selected period of time, such as 5 minutes, 10 minutes, or 15 minutes. Alternatively, a search may be conducted for all transactions started within a certain time window, all transactions that have issued more than a threshold number (such as 10,000) of SQLs and are not finished, and all transactions that have issued more than a threshold number (such as 10,000) methods and are still not finished. It will be understood that the user will be able to select the parameters, including threshold lengths of time in the system and threshold numbers of transactions, based on the user's experience with the particular system and applications.

Figure 14:
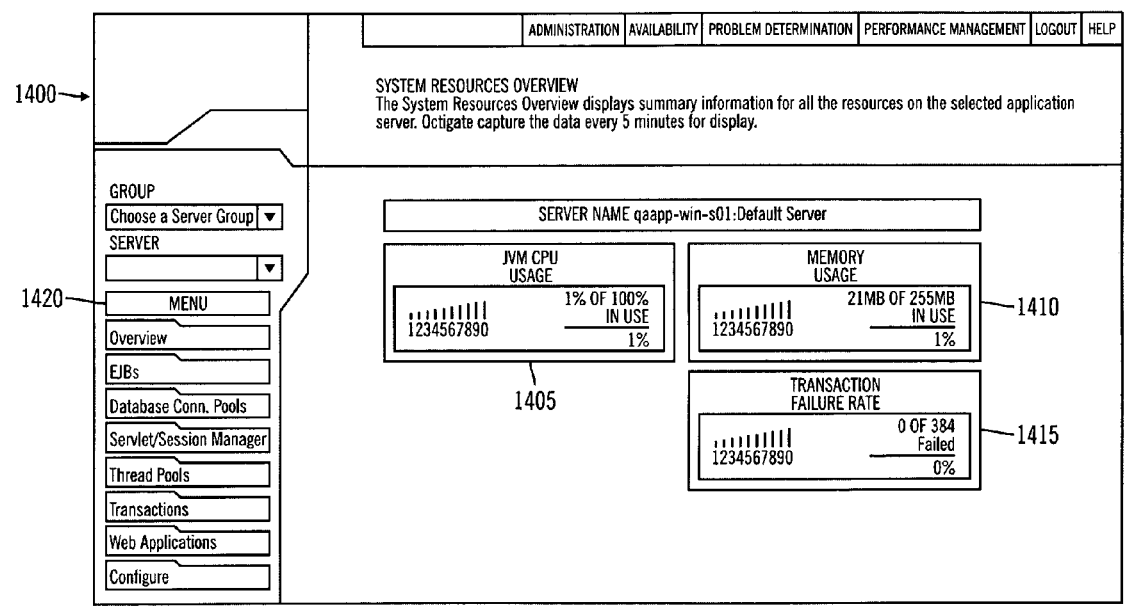
Figure 15:
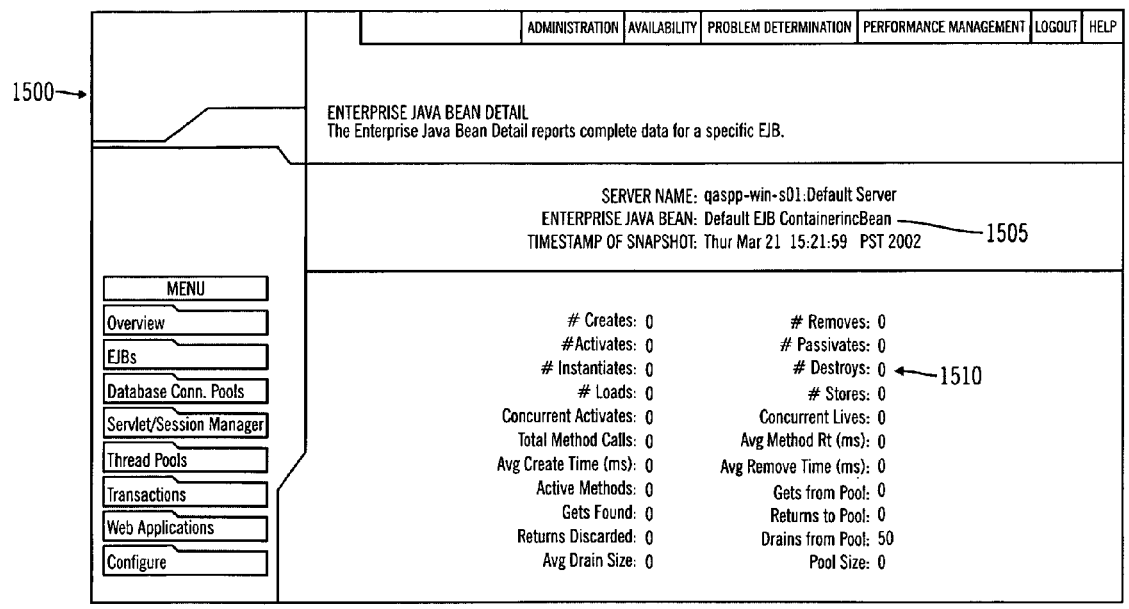
Figure 16:
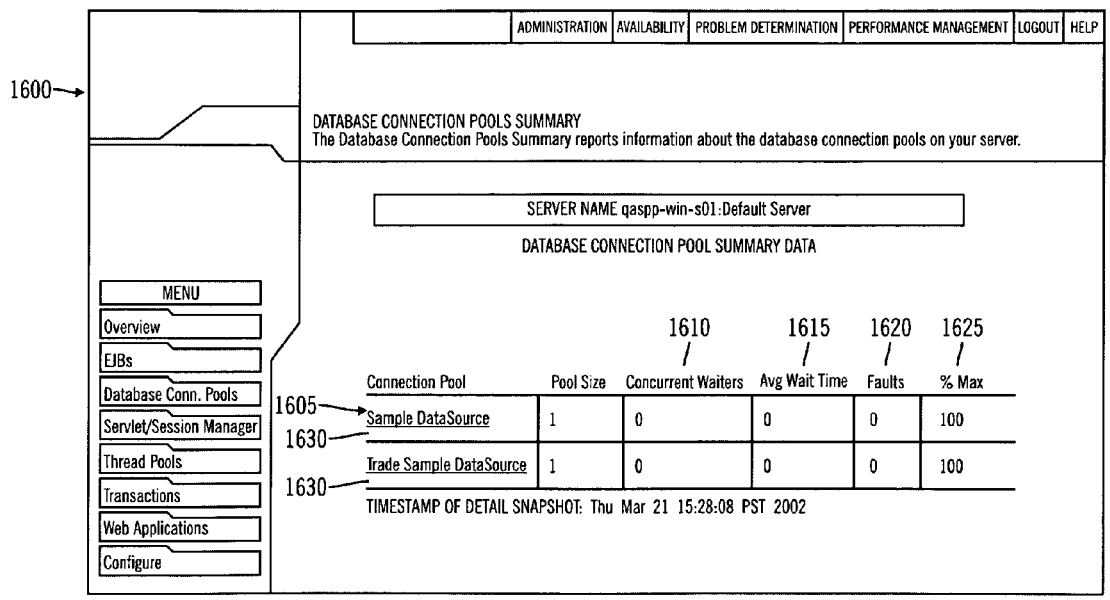
Figure 17:
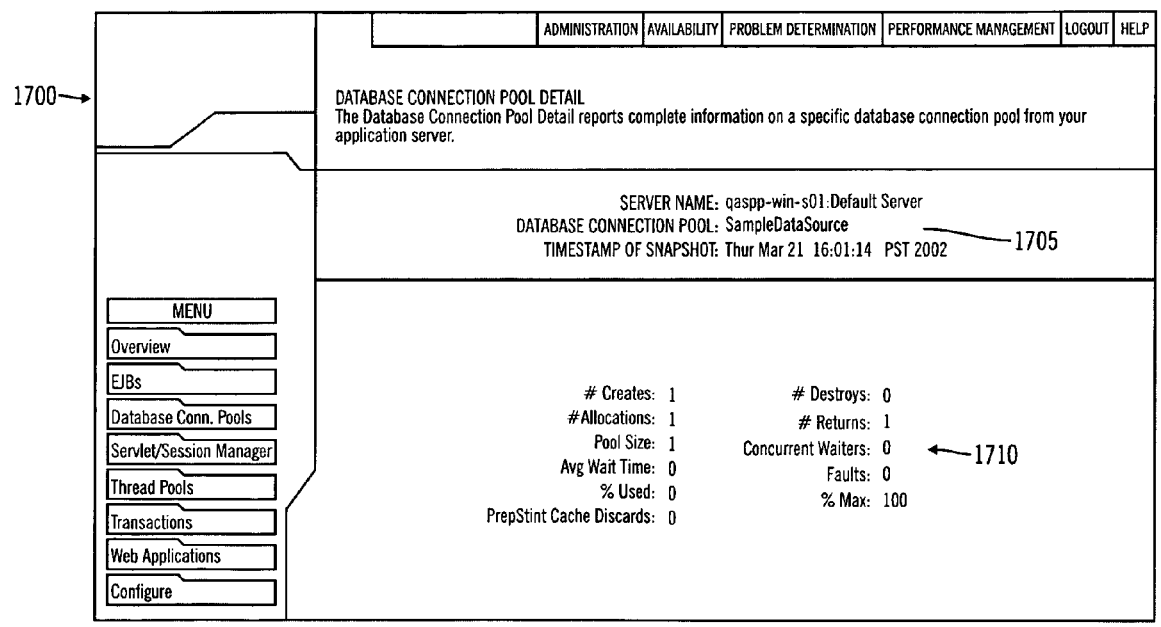

The method of the invention preferably provides an application server system resources analyzer. This analyzer may also be selected to compare the operation of various servers. The user may be presented with the option of selecting the system resource analyzer at all or any points in the above drill-down description. An existing tool, such as the Websphere PMI interface, may be used to provide the information. A first page in the server system resources analyzer will be referred to as the system resource portal. The system resource portal provides information as to a number of different resources, such as different servers. Preferably, the information furnished as to each resource is shown as a percentage of a maximum, and may be displayed graphically. Such techniques as using different colors if the use of a given resource is within a certain defined threshold of a maximum may be employed. Information that may be displayed includes pools, memory usage, CPU usage, application activity, and in-depth resource information links. An example is shown at FIG. 14 as display 1400. In this exemplary display, CPU usage is shown at 1405, memory usage at 1410, and a transaction failure rate at 1415. In-depth links are provided in menu 1420. As to enterprise java beans, the user may select a list of enterprise java beans, using the menu 1420. From that list, the user may select one of a number of enterprise java beans. In response to the selection, a display of a large amount of information as to the methods of the selected enterprise java bean may be shown, including the information shown at FIG. 15 in display 1500. In addition to identifying the enterprise java bean at 1505, various method information is shown at 1510. Quantity information such as the number of methods created, the number removed, the number activated, the number passivated, the number instantiated and destroyed, the number loaded and stored, the number of concurrent active methods, the number of concurrent live methods, the number of method calls, and other information, may be shown. Statistical information may also be shown, such as the average create time and average remove time. As to database connection pools, the user may select additional information as to database connection pools from menu 1420. In response, a database connection pools summary page, such as that shown in FIG. 16 as display 1600, is displayed. For each connection pool shown in rows 1605, such information as concurrent waiters, as at column 1610, average wait time, as at column 1615, faults, as at column 1620, and percentage used, as at column 1625, may be shown. A further level of detail as to database connection pools may be selected from the database connection pools summary page, such as by selecting an individual database connection pool name 1630. The further level of detail is displayed at a database connection pool detail page, such as display 1700 of FIG. 17. Display 1700 may include, in addition to an identification of the particular database connection pool at 1705, such information as timestamp of the detailed snapshot, a number of created connections, a number of destroyed connections, a number of returned connections, a number of allocated connections, pool size, and a number of discards from a prep statement cache, as well as the information from the database connection pools summary page, as shown generally at 1710.

Figure 18:
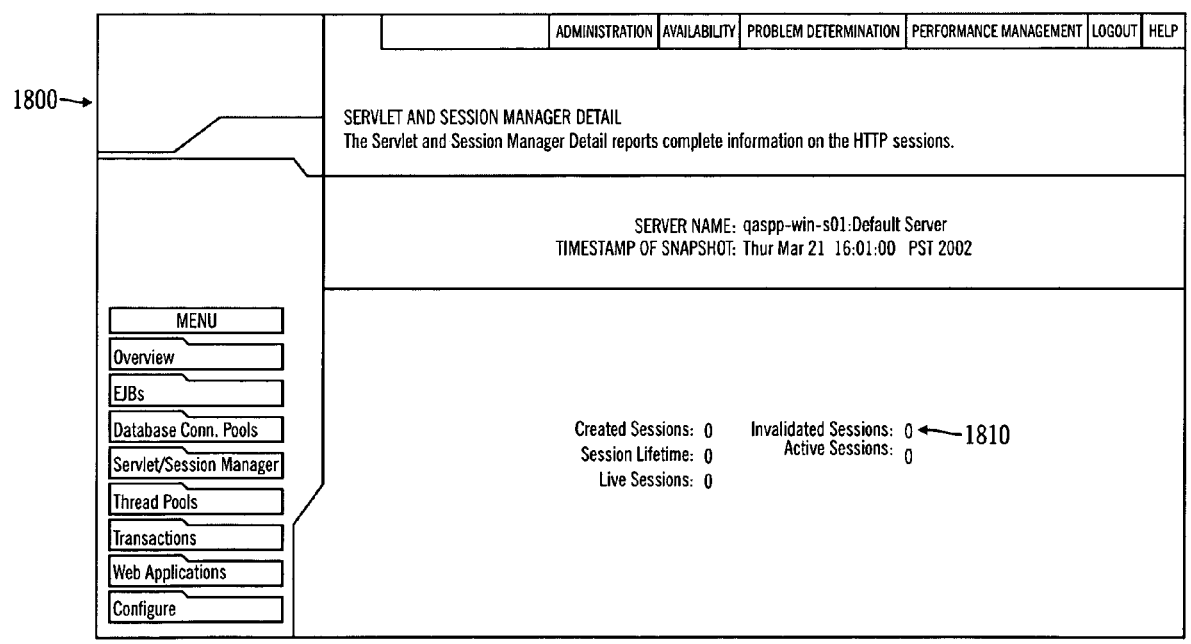

As to servlet and session managers, a servlet and session manager summary data page may be selected from menu 1420. An example of such a page is shown as display 1800 in FIG. 18. This page identifies, as generally shown at 1810, the number of created sessions, the number of invalidated sessions, the number of finalized sessions, the session lifetime, the number of active sessions and the number of live sessions.

As to thread pools, a thread pools summary page may be selected from menu 1420. An example of a thread pools summary page is shown as 1900 in FIG. 19. The thread pools summary page may show a list of thread pools, such as in rows 1905, preferably with a timestamp of the detail snapshot, the number of thread creates, the number of thread destroys, the number of active threads, the pool size, and the percent of maximum resources used.

Figure 20:
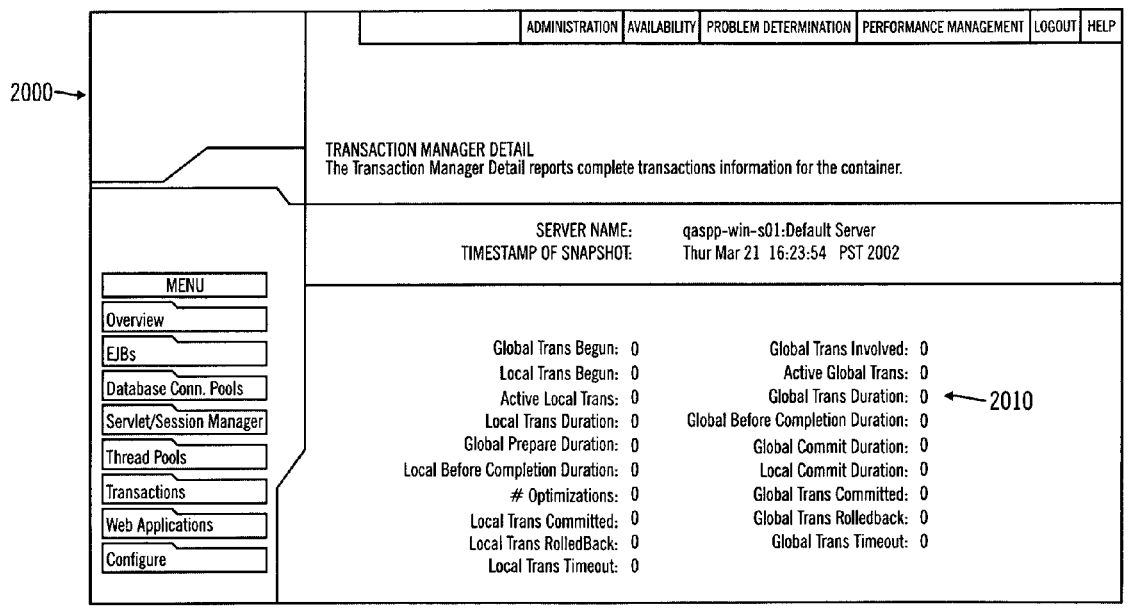

A transaction manager detail page, which may be selected from menu 1420, may include, as shown as display 2000 in FIG. 20, a timestamp of a snapshot, and, generally at 2010, the numbers of each of the global transactions begun, the global transactions involved, local transactions begun, active global transactions, active local transactions, global transaction durations, global before completion duration, global preparation duration, global commit duration, local before completion duration, local commit duration, number of optimizations, global transactions committed, and local transactions committed, global transactions rolled back, local transactions rolled back, global transactions timed out, and local transactions timed out.

Figure 21:
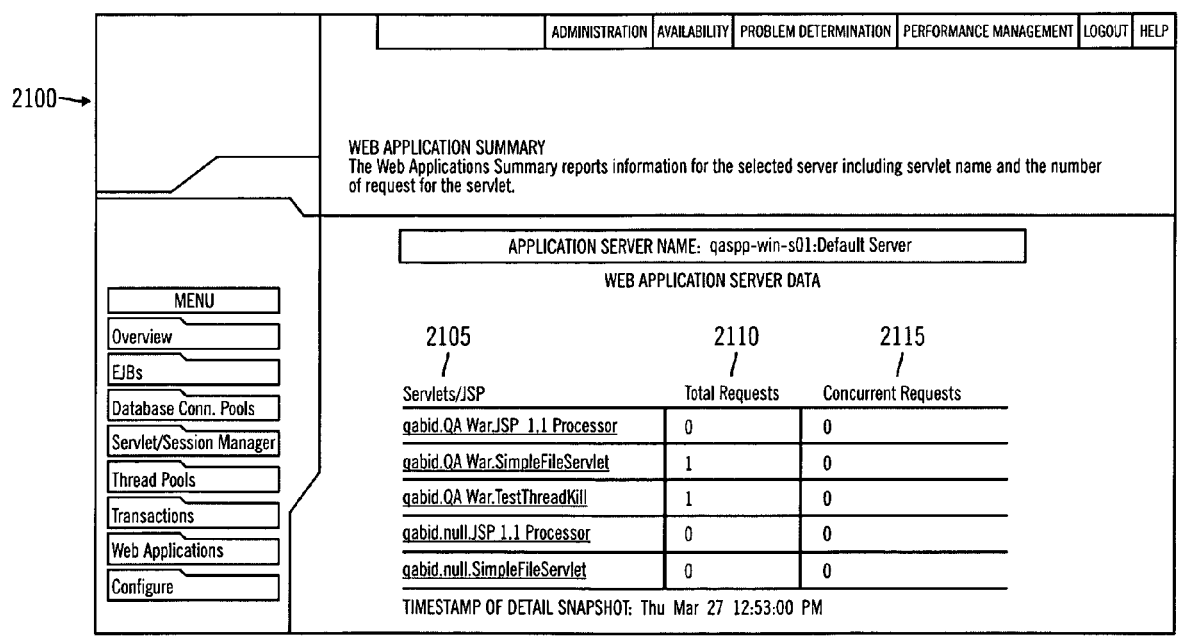
Figure 22:
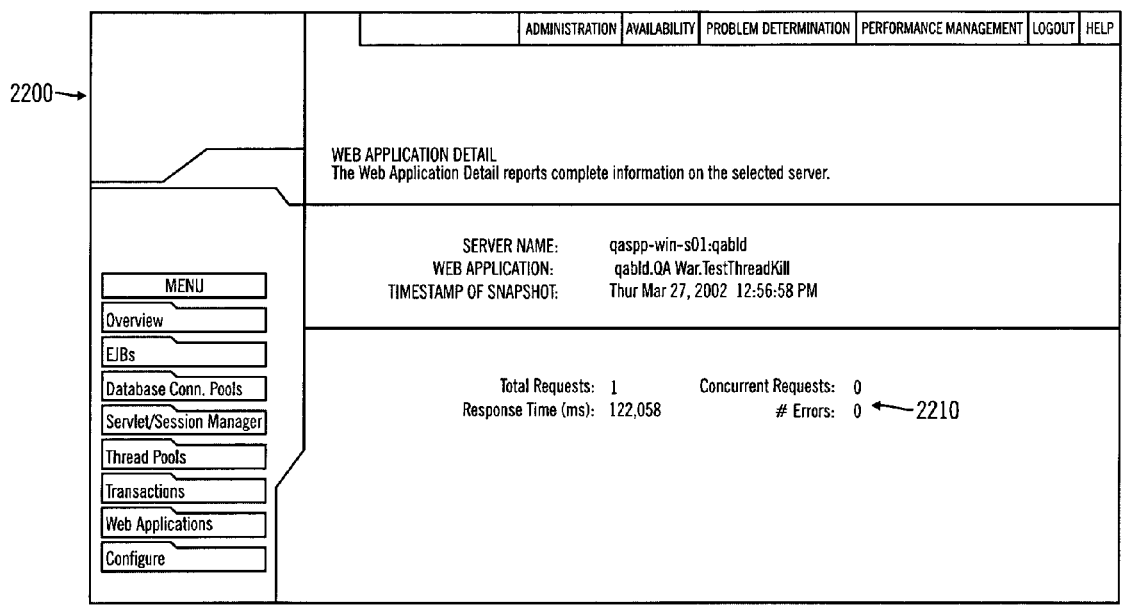

A web applications summary page may be selected from menu 1420. The web applications summary page, an example of which is shown in as display 2100 of FIG. 21, may show a list of servlets, identified by name at column 2105, for example, with, in columns 2110 and 2115 respectively, total requests and concurrent requests for each. Lists of JSPs, with total requests and concurrent requests for each, may also be displayed. A web application detail page may be selected by clicking on the name of a servlet or JSP from the web applications summary page. A web applications detail page is illustrated in FIG. 22 as display 2200, and shows, as to the selected servlet or JSP, a timestamp, and, generally at 2210, the total requests, the concurrent requests, the response time, and the number of errors. The ready display of the foregoing types of information may be useful to the user in identifying the source of problems identified in one application and not in another.

It will be appreciated that the method of the invention may be executed with variations in the particular information available at each level, the manner of display of the information, and the drill down paths available to the user at each level. The number of levels may also be varied within the scope of the invention. The method may provide for customization by a user or by an administrator of the number of levels, the types of information displayed at each level, and the manner of display.

User Rights

A method and system of the invention provides for permitting each user to have access to the status of defined functions and applications. A system administrator has the option of creating accounts for each individual user. Each user may be assigned to one or more application server groups, which are associated with the user's account. Each user will be entitled to view information pertaining only to the application server groups selected for that user's account by the system administrator. Each user may have a password required to access the system. In a preferred embodiment, the operating system, e.g., unix, performs the password validation. The assignment of servers to server groups is also under the control of a system administrator, as is the assignment of users to server groups. Different server groups with overlapping membership may be created. Users may similarly have varying rights to view and execute commands on various servers and server groups.

Figure 3:
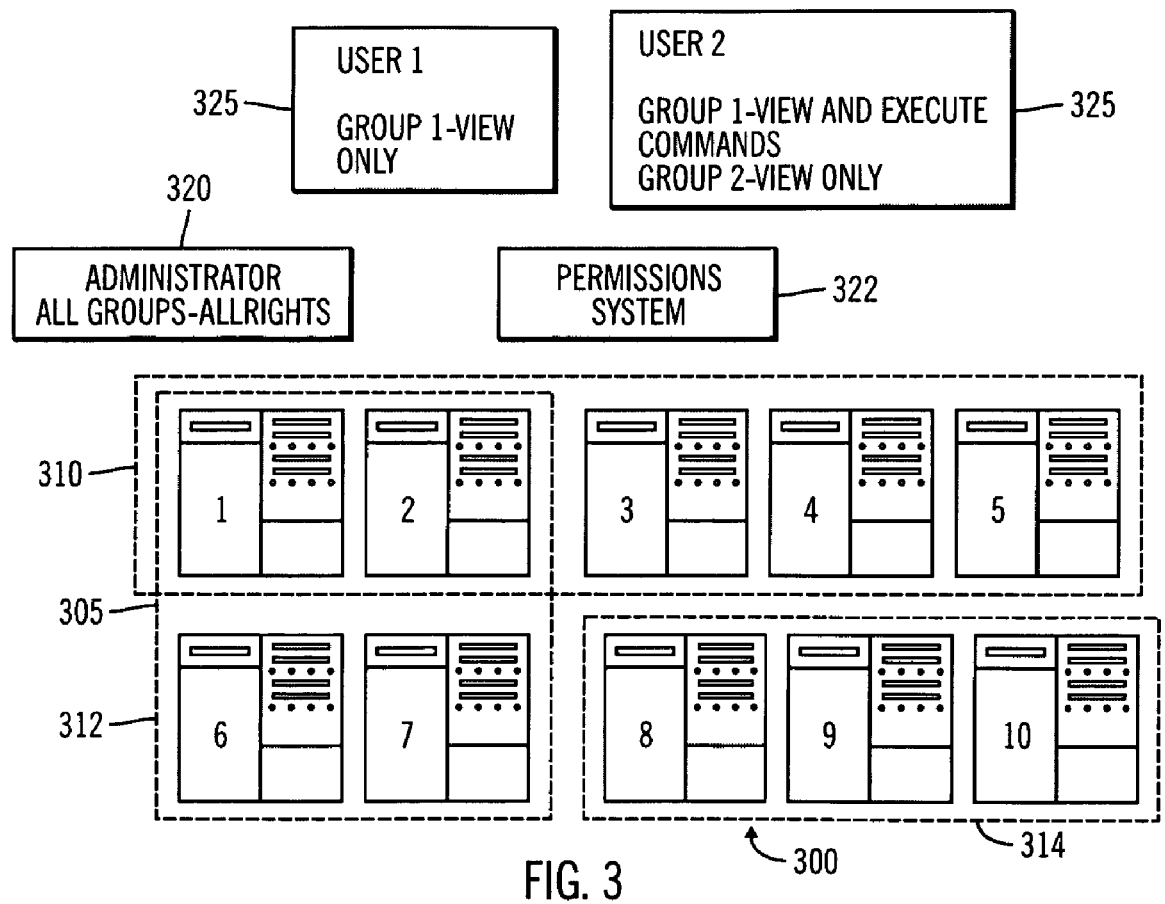
FIG. 3 is a schematic representation of a feature of the invention.

By way of example as to access, a simplified system is illustrated in FIG. 3. System 300 has ten servers 305 designated as servers 1 to 10. Each server 305 is designated to at least one of server groups 310, 312, 314. A first server group 310 may include servers 1-5. A second server group 312 includes servers 1, 2, 6 and 7. Third server group 314 includes servers 8, 9 and 10. Thus, server groups may or may not have overlapping membership. Administrator 320 is shown with all rights to all server groups, and rights to alter permissions system 322. Users 325 are graphically shown with varying rights to view information, execute commands, or no rights at all. A single user may have first rights as to a first group, and second rights as to a second group. The first rights may include rights to view information only, with no rights to execute commands. The second rights may include rights to view information and rights to execute selected commands or all available commands. It will be appreciated that the server groups may or may not overlap. More than two sets of rights may be provided.

Configuring of Data Collectors

Figure 4:
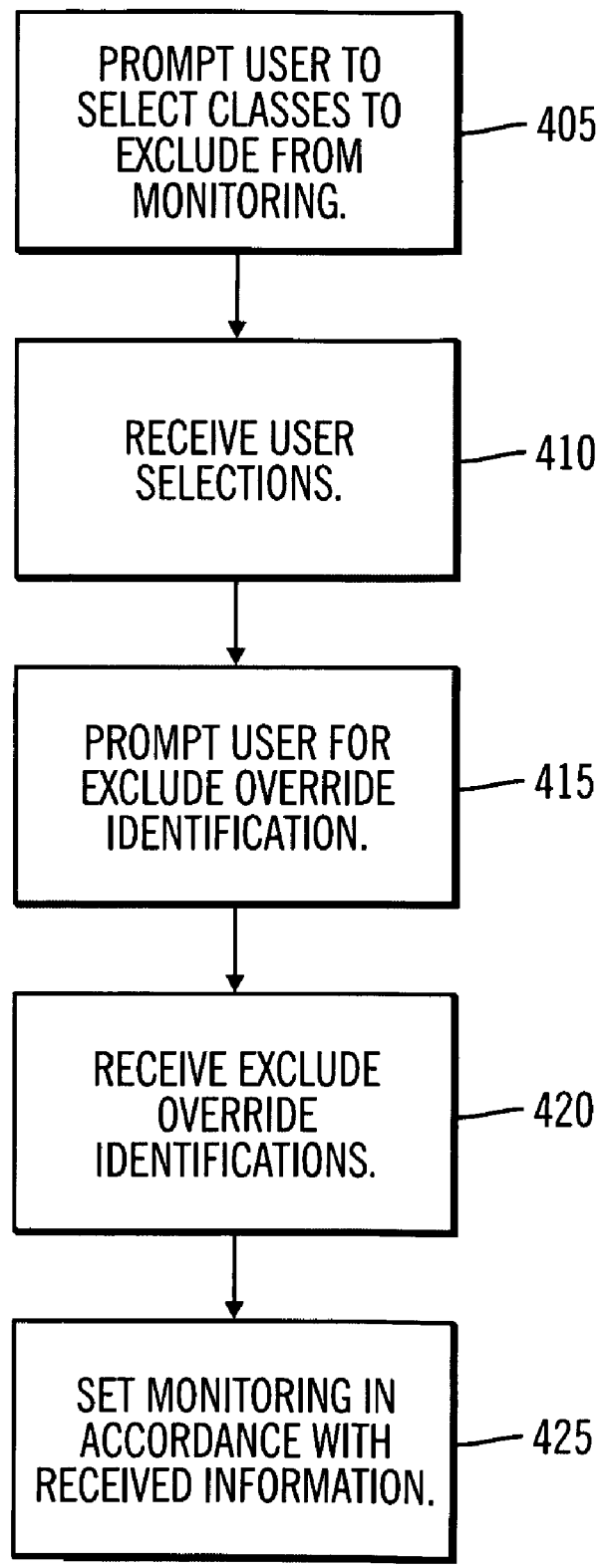
FIG. 4 is a process flow diagram illustrating an exemplary process flow in accordance with the invention.
Figure 23:
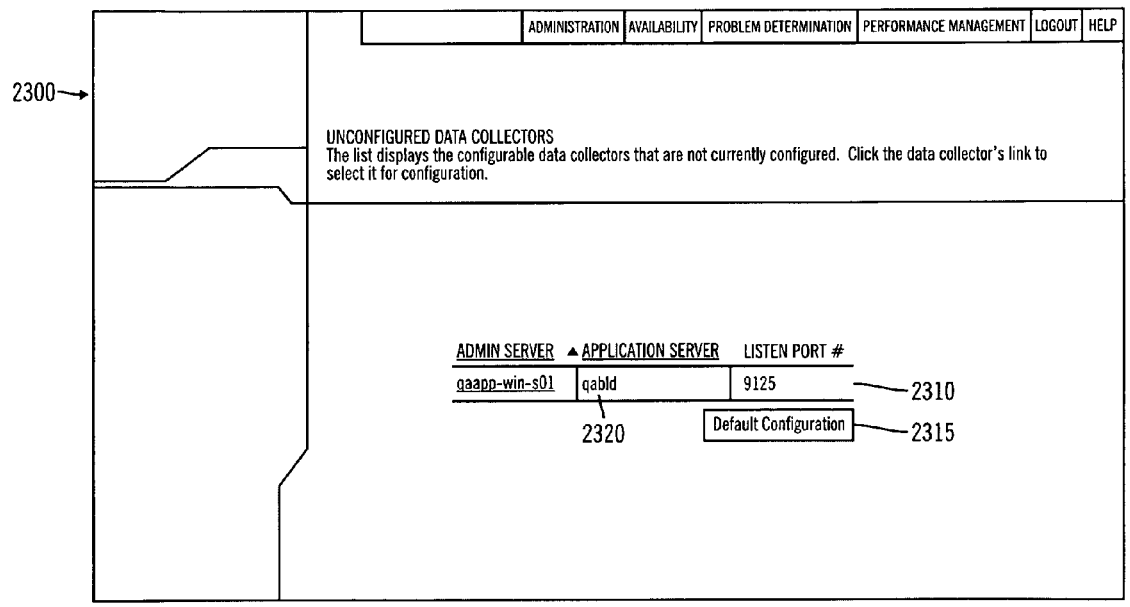

In a method of the invention, the displayed information is collected through monitoring of applications. The applications to be monitored may be dynamically adjusted in a method of the invention. It will be appreciated that any monitoring diverts system resources from the performance of the function of a server or group. Accordingly, the ability to select applications for monitoring means that system resources may be conserved for monitoring only of problematic applications, for example. The selection may preferably be conducted either at the server or group level. Referring to FIG. 23, there is shown an unconfigured data collectors configuration page 2300. Unconfigured data collectors are listed at 2310. This page is used to register configurations of data collectors. A default data collector configuration may be selected from this page, such as by button 2315, or a name of a data collector at 2320 may be selected for custom configuration. If custom configuration is collected, a data collector configuration page is displayed, as illustrated by display 2400 of FIG. 24. A class name filter list (exclude), displayed at box 2405, is a list of classes that will not be monitored unless those classes are listed in an exclude override list. A class name filter list (exclude override), displayed at box 2410, is provided for input of a subset of classes in the exclude list that will be monitored. All classes that are not in the exclude list will be monitored. Only a subset of the classes in the exclude list are monitored. This technique permits the user to select a minimum necessary number of class names for filtering, so that resources are not unnecessarily allocated to monitoring. For example, the exclude list may include the class "java.*", and the exclude override list may include "java.util.*", where the "*" indicates any extension. In the exemplary process flow of FIG. 4, the user is prompted to input a class, at block 405. The identified class or classes are received from the user, as indicated at block 410. At block 415, a user is prompted for exclude override identification. At block 420, exclude override identifications are received. At block 425, set monitoring is set in accordance with received information.

Exemplary System Architecture

The problem determination system of the invention may have the architecture described below. The architecture may be in the nature of an agent operating on each application server, and the remaining components on a dedicated server, including a kernel providing central control, a publish server for receiving data from the probe engine, an archive agent for moving data from the cache to a database, a database, a visualization engine for providing all end user applications, and an application server agent for collecting certain application server specific data from an application server (such as Websphere). Application server agents are installed on application servers. Probe and publish engine 2511 (FIG. 25) is the principal component of an application server agent. The remaining components may be installed on a dedicated server. Kernel 2530 (FIG. 25) provides central control. Publish server 2540 (FIG. 25) receives data from an application server agent and moves data to an archive agent. An archive agent moves data to database 2560. A visualization engine proves all end user applications, and communicates with the database for historical information, and directly with the application server agents to request and receive snapshot information.

In one embodiment, the source of the data provided to the user in the method described above may be a probe and publish engine. The probe and publish engine obtains all information pertaining to specific threads. In a preferred embodiment, the standard Java profiling interface (JVMPI) may be employed for probe agents.

Figure 25:
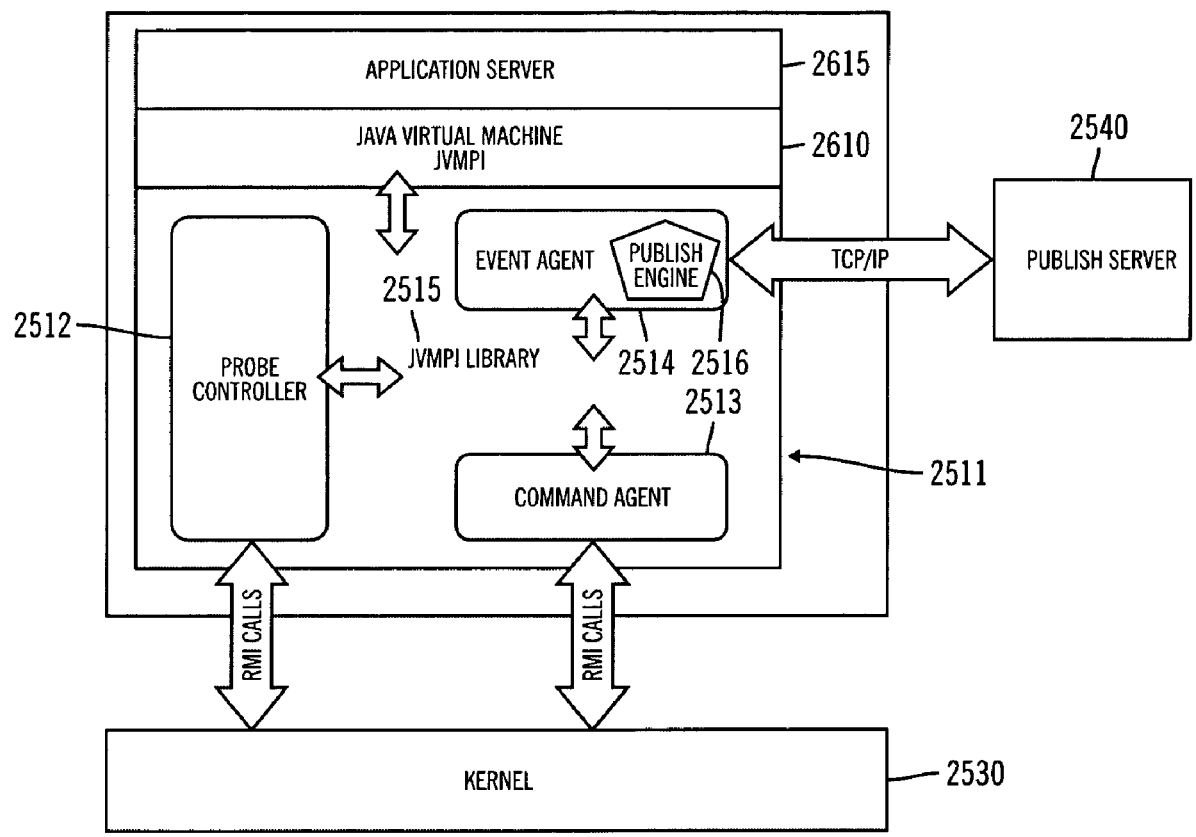
FIG. 25 is a schematic diagram of an exemplary architecture of a system according to the invention.

Referring to FIG. 25, probe and publish engine 2511 is shown in relation to the java virtual machine 2610 with which it communicates, as well as the application server 2615. Probe and publish engine 2511 preferably has five components: the probe controller 2512, command agent 2513, event agent 2514, event handlers 2515, and the publish engine 2516. Probe controller 2512 is a controller thread that controls the life cycle of the other components. Event agent 2514 registers the event handlers for JVMPI events of interest. When such events occur, the handlers are then invoked. The handlers collect the relevant information and add it to an event queue. Publish engine 2516 then obtains the data from the event queue and sends it to the publish server 2540. The agents may be constructed using the standard Java profiling interface provided with Java Development Kit 1.2.2 or above.

In this embodiment, a JVMPI library is loaded with the JVM, and communicates with the JVM, the probe controller, the event agent, and the command agent. JNI functions may be used to capture all event-based data, and date/time stamp, wall clock and CPU clock. Events that are registered by the JVMPI library are shown at Table 1:

TABLE 1

|  | JNI/C | Java | Thread |
|---|---|---|---|
| JVMPI library | Yes | No | No |
| Event Agent | Yes | No | Yes |
| Command Agent | Yes | Yes | Yes |
| Publish Engine | No | Yes | No |
| Probe Controller | Yes | Yes | Yes |

Information obtained from the JVMPI library is stored in an queue, called the event queue, and the event agent retrieves records from the queue, packs them in a packet, and sends them to the publish server via the publish engine. The data collected from the queue by the Event Engine are shown at Table 2:

TABLE 2

| Server Id | | Component Id |
|---|---|---|
| Websphere Admin Node name | | |
| Websphere Application Server Name | | |
| Thread Id | JVMPI | JNI Environment |
| Class Name | JVMPI | Stored in class/method name list of JVMPI Library |
| Method Name | JVMPI | As above |
| Method Signatures | JVMPI | As above |

TABLE 2-continued

| Server Id | | Component Id |
|---|---|---|
| Type (Bean/Servlet/JSP/JDBC) | JVMPI | By checking if the class is inherit from a special class |
| Data and Time Stamp | OS | |
| Wall clock | OS | |
| CPU clock | JVMPI | Use JVMPI function getCurrentThreadCpuTime. Only support for IBM Development Kit 1.3 and AIX 5.1 |
| Request [URL] or SQL call | JVMPI | Require converting JVMPI object Id to JVMDI object reference. |

The Command Agent is an RMI service registered with the kernel. The Command Agent receives commands from the visualization engine and other external components and satisfies them using JVMPI or JNI calls. An exemplary list of commands, and whether the commands are provided to the JVMPI or the JNI is shown at Table 3.

TABLE 3

| | |
|---|---|
| Stack Trace | JVMPI |
| Session object | JVMPI |
| Request object | JVMPI |
| Suspend thread | JNI |
| Hard kill thread | JNI |
| Soft kill thread | JVMPI |
| Change thread priority | JNI |
| Datasource Maximum Connection Pool | JVMPI |
| ORB Pool Size | JVMPI |
| Web Container Pool Size | JVMPI |

Figure 26:
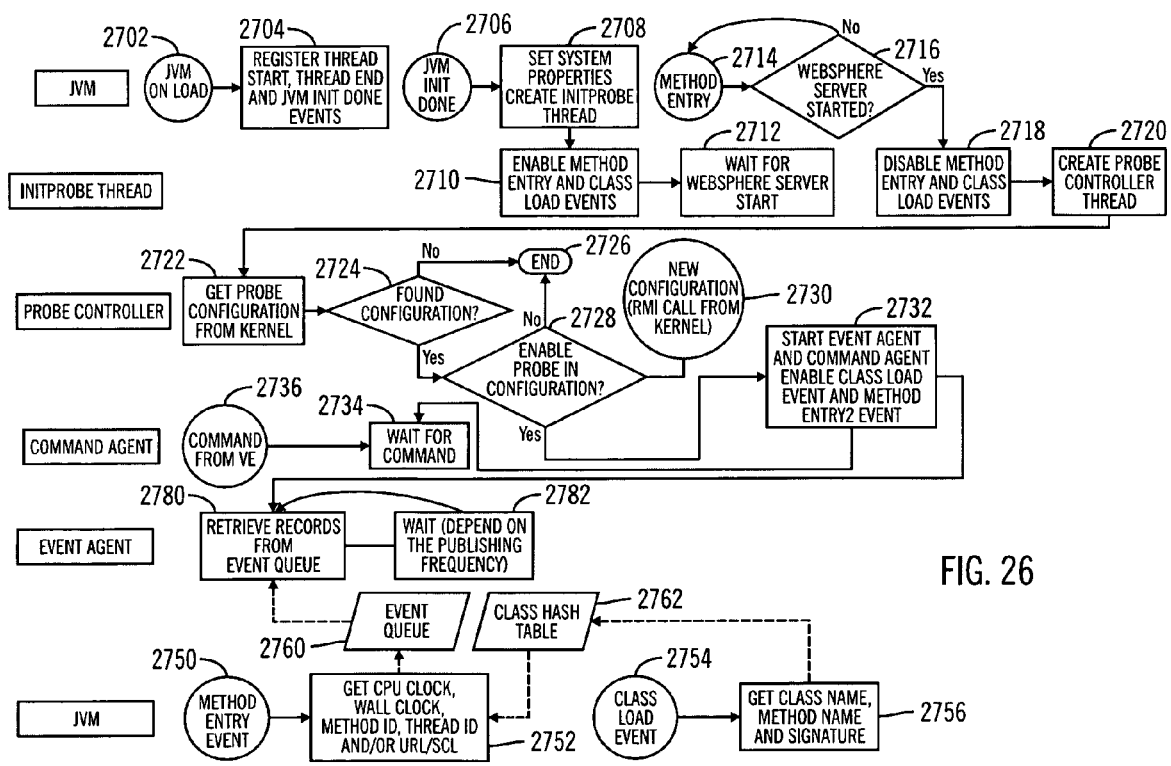
FIG. 26 is a flow diagram illustrating an exemplary architecture of a component of a system of the invention.

The probe controller is also preferably an RMI service registered to kernel 2530, and starts and stops other probe components gets the probe's configuration. New configurations of probes are sent from kernel 2530 to the probe controller. The probe controller will determine if a probe should be started or stopped or a filter changed upon receiving a new configuration. A logic diagram for the Probe/Publish Engine is provided as FIG. 26. In accordance with this logic diagram, when the JVM is loaded, as shown at 2702, events identifying thread starts, thread end and completion of initialization of the JVM are registered to the kernel, as shown at 2704. When initialization of the JVM is completed, as indicated at 2706, then the system properties are set and a thread for initiating probes is created, as indicated at 2708. The thread then enables the method entry and class load events, as indicated at 2710, and waits until the application server has started, as shown at 2712. A method entry starts a process flow in the JVM, at 2714, which checks to see if the application server is started, at 2716. If it is started, the process flow is passed to the InitProbe Thread, which disables method entry and class load events, at 2718, and creates a probe controller thread, at 2720. The probe controller thread seeks a probe configuration from the kernel, at 2722. If the probe configuration is not found, then the flow ends, as indicated at 2724 and 2726. If the configuration is found, the process flow proceeds to determination if the probe is enabled in the configuration, at 2728. If not, then the process flow ends. A process flow may also commence with a new configuration in the form of an RMI call from the kernel, as indicated at 2730. If the probe is enabled, then the process flow proceeds to start the event agent and command agent, enable a class load event and a method entry2 event, as shown at 2732. The command agent awaits a command from the visualization engine, as indicated at 2734 and 2736. The enabling of the method entry event starts a process flow in the JVM, as indicated at 2752. Data, such as CPU clock, wall clock, method identification, thread identification, and/or URL and SQL are obtained, as indicated at 2750, and passed to event queue 2760. The class load event initiates a process flow in the JVM, as shown at 2754. A function of get class name, method name and signature is initiated, as shown at 2756, and this information is passed to class hash table 2762. The event agent retrieves records from the event queue 2760, as indicated at 2780. The event agent will wait depending on the publishing frequency, as indicated at 2782.

Figure 27:
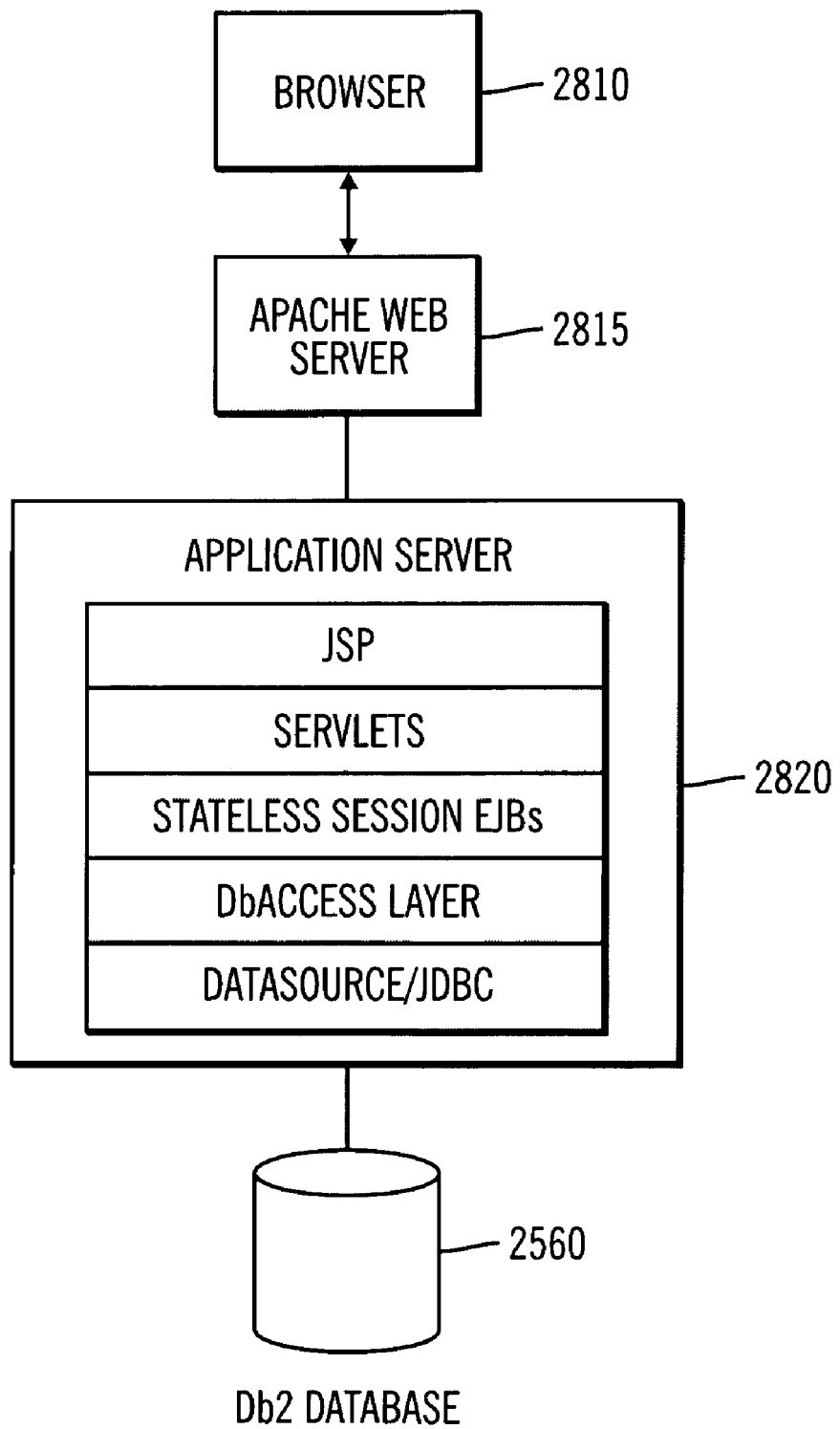
FIG. 27 is a schematic diagram of an exemplary architecture of a component of a system according to the invention.

A visualization engine provides the front end user interface component used in the method and system of the invention. Standard J2EE technologies may be used for implementation of a visualization engine. The front-end framework of the visualization engine handles housekeeping such as session management and security. The visualization engine preferably handles as many common tasks as possible in order to provide an environment conducive to the development of front-end application and business logic components. The visualization engine sits on top of a database, which it accesses in response to user requests. The architecture is illustrated at FIG. 27, and is shown to be browser-based, using a browser 2810, communicating with a web server 2815, which may be an Apache web server, and an application server 2820, such as IBM's Websphere, interfacing between the database 2560 and the web server 2815. Servlets may be used to handle requests and manage application flow. Servlets may also be employed to control front-end behavior by performing form data-entry validation and sending java bean objects containing data to JSP pages. JSP pages may handle most of the front-end presentation logic. Business logic may be implemented using enterprise java beans Generally, stateless session beans are used.

Servlets may be used for form-entry data validation, as noted above, and for application logic flow. A base servlet may be provided that all servlet applications must extend. The base servlet sets up global variables, handles authentication and authorization, and performs redirects to login and access-denied pages as necessary. Resource bundle, log message and audit trail message files are provided. The JSP's generate HTML code to render the web page to be displayed in the browser. Servlets pass the desired data to the JSP's using java bean objects.

The top layer of the stateless session beans makes up the API. There may be a layer of enterprise java beans or java classes below the top layer that deals with access to data from the database. Data from the database may be obtained through a database access layer that is part of the DBAccess data access framework.

The application activity display function provides real-time access to data, as noted above, and involves direct communication between the visualization engine and the corresponding publish server and probes. A publish server interface and command agent interface are provided for this direct communication. The stubs to these interfaces are maintained by the kernel, and are retrieved by the visualization engine by performing a lookup from the kernel using a lookup agent helper client. Each server in which probes are running has a unique identification for the probe. Once the probe identification has been obtained, the interface stub of the command agent is obtained from the kernel. The identification of the publish server used by the probe is then obtained from the probe. The corresponding interface stub of the publish server is obtained from the kernel. The list of active requests and associated data can then be obtained directly from the selected publish server. Additional request data can be obtained from the probe directly. Commands such as thread modification, kill thread, and change priority are transmitted directly to the probe through the command agent interface. Communications between the visualization engine and the command agent and publish server of the probe are real-time and synchronous.

The visualization engine includes the security functions discussed above. A proprietary API was developed because the J2EE specification security features are not sufficient to provide the security features described above. Security features consist of authentication and authorization functions. Authentication is performed via a proprietary 0Java API that wraps a third party authentication system. Authorization is performed by maintaining access control lists by users or groups. A user is associated with specific groups and can only access data for servers in those groups. Servers are each associated with one or more groups.

Figure 28:
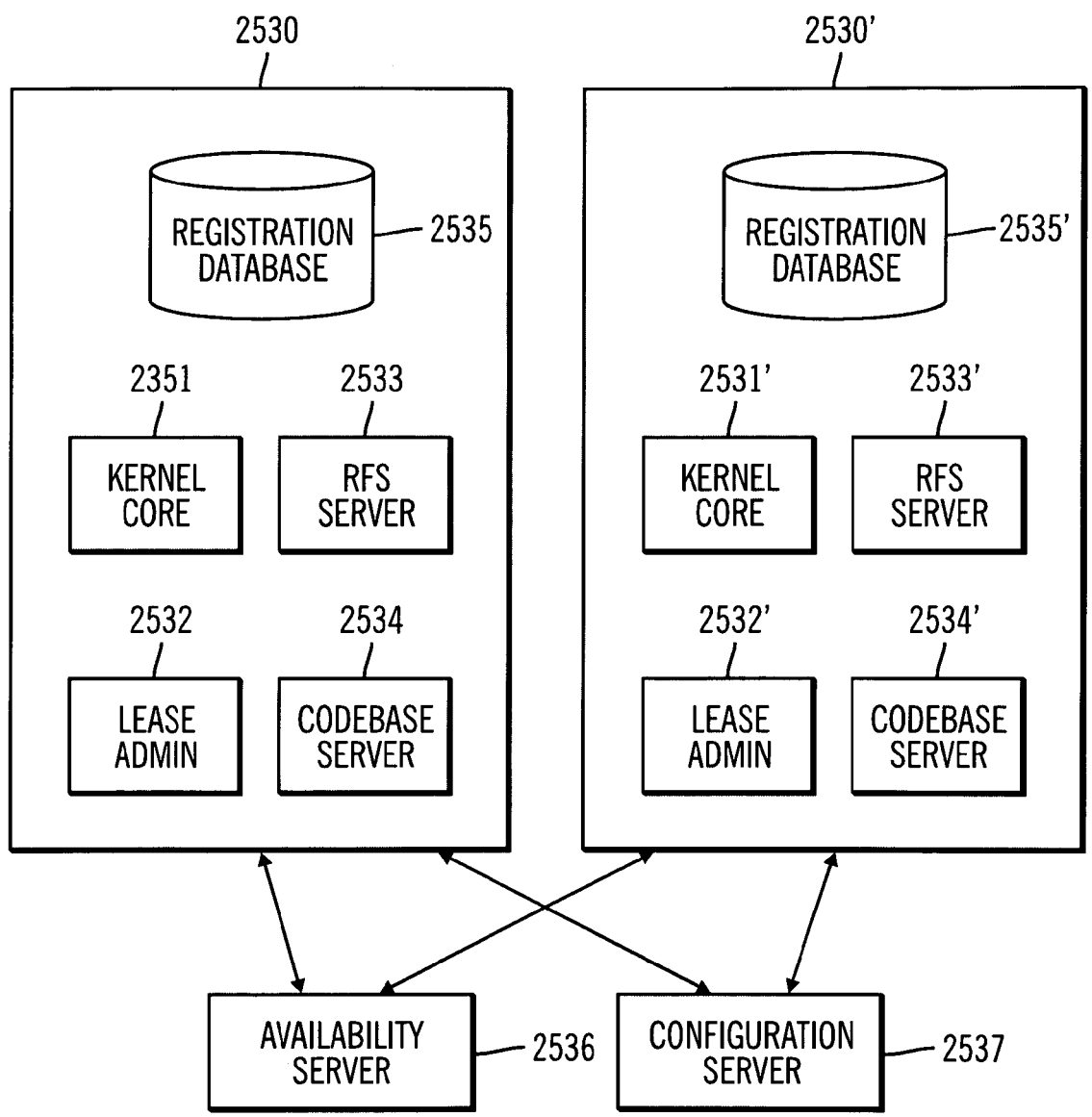
FIG. 28 is a schematic diagram of an exemplary architecture of a component of a system according to the invention.

The kernel will now be described in detail. The kernel enables various services to discover each other on a network and provides a way for services to interact in a dynamic, robust way. No user intervention is required when services are brought on or off line. Services that join the kernel can adapt dynamically when any of the other services go on or off line. Consumers of the services do not need prior knowledge of the service's implementation. Referring to FIG. 28, two instances of the kernel, 2530 and 2530', are shown. The architecture of the kernel 2530 features a core 2531, a lease administrator 2532, an RFS server 2533, a codebase server 2534, a registration database 2535, an availability server 2536, and a configuration server 2537. The architecture of the kernel 2530' features a core 2531', a lease administrator 2532', an RFS server 2533', a codebase server 2534', a registration database 2535', the availability server 2536, and the configuration server 2537. Two instances of the kernel are preferably running on separate servers for enhanced availability.

The kernel core 2531 handles all join, renew, leave and lookup requests from a service. The services are probe agents, the availability server 2536, and the configuration server 2537. For a join request, the service passes a proxy object and its associated service attributes to the kernel. The kernel fulfills the request by storing the proxy object and service attributes in the registration database. When a client needs a certain type of service to accomplish a task, it looks for the service by passing a search template and issuing a lookup request to the kernel. Based on the search template, the kernel will return the corresponding proxy object to the client. Each service is required to renew its lease by issuing a renew request to the kernel periodically. If the kernel does not receive a renew request when required, the kernel removes the service's proxy object and service attributes from the registration database. This renewal requirement avoids requests being sent to services that are unavailable. The probe and publish server preferably bundles the application and system information, such as the volume of completed requests and CPU utilization, when the lease is renewed. The lease concept thus serves to report the availability of the server and high-level statistical information. A service may also issue a leave request to the kernel.

The lease administrator component 2532 keeps track of the records in the registration database. If any registration is expired, or a leave request is received, the lease administrator 2532 causes the corresponding record to be removed so that the kernel will not pass the corresponding proxy object to any clients. The RFS (request for stub) server 2533 listens on a port for connections. When a connection is identified, a serialized stub object of the kernel is sent out to the service or client to use in interfacing with the kernel. The codebase server 2534 is similar to an HTTP server, but provides a facility to allow clients of a service to download the class definitions of the proxy object it obtains from the kernel. The registration database 2535 provides in-memory storage for proxy objects and associated service attributes. Server availability and statistical information resides in the registration database 2535.

The availability server 2536 takes snapshots and stores the history of the registration database 2535 in order to facilitate providing availability of servers and statistical data to the visualization engine.

The configuration server 2537 is a centralized place to store configuration data for all components. Configuration data is in XML form and is kept in the database. Users may change configuration through the visualization engine. When this is accomplished, the configuration server 2537 retrieves from the kernel a list of proxy objects that are adapting to the old configuration. The configuration server 2537 makes use of the proxy objects to broadcast the new configuration. This serves to update the configuration of probes in response to user commands at the Visualization Engine.

A helper utility, called JoinManager, requests the stub object of the kernel, and joins the kernel with the proxy object as well as its service attributes. If the stub object is not available, the utility will continue to retry until it succeeds. This utility also maintains and renews the lease. A lookup manager utility may be used by a client to look up a specific service.

Figure 29:
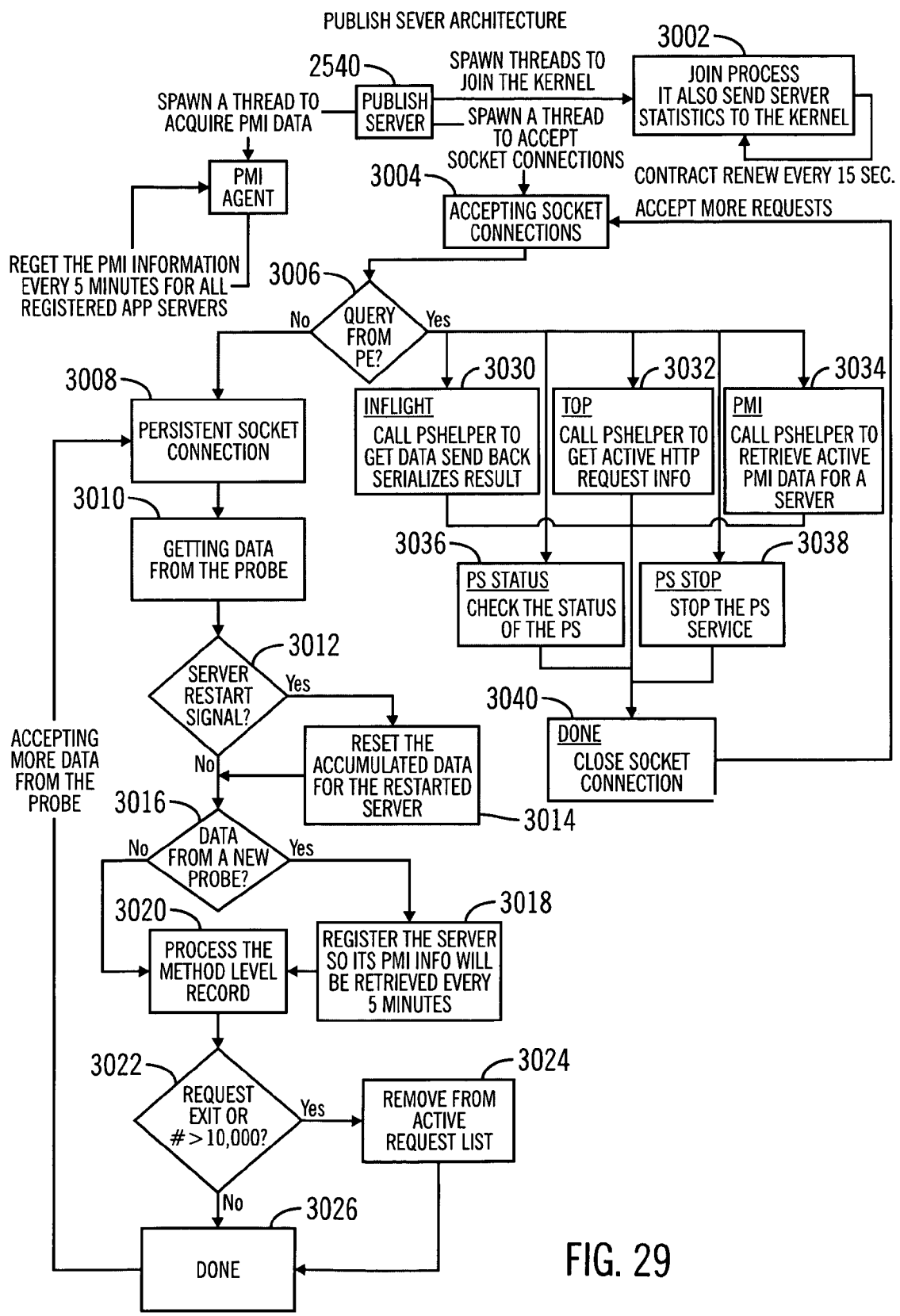
FIG. 29 is a flow diagram illustrating an exemplary architecture of a component of a system of the invention. Referring now to the drawings in which like reference numbers represent corresponding parts throughout.

The publish server 2540 manages data received from the various publish engines. Multiple publish servers may be provided in a single installation. The publish server provides query capabilities for the visualization engines. The publish server also manages the incremental retrievals of performance management interface data. The publish server architecture is shown at FIG. 29.

Publish server 2540 may be implemented as a multi-threaded process. Each thread connects to a specific publish engine and receive data from it. It may also contain additional threads to deal with startup, shutdown and communications to the kernel.

Referring to FIG. 30, publish server 2540 spawns a thread to join the kernel, and regularly renews its contract, as shown at 3002. Publish server 2540 also spawns a thread to accept socket connections, as indicated at 3004. As indicated by decision block 3006, the next step depends on whether a query is received from the corresponding publish engine. If, rather than a query, data is received, a persistent socket connection is established, as indicated at 3008. The data is also associated with a request. Data is then obtained from the probe via the publish engine, as indicated at 3010. If a server restart signal is received, as indicated at 3012 and 3014, then the publish server resets the accumulated data for the restarted server before proceeding. If the data is from a new probe, as indicated at 3016 and 3018, then the server is registered so that the server's PMI information will be retrieved periodically, such as every 5 minutes. The process flow then proceeds to processing method level records received from the probe, as indicated at 3020. If an exit is requested or the number of records is excessive, as indicated at 3022, then the probe is removed from the active request list, as indicated at 3024. The process flow then returns to accept more data from the probe, as indicated by labeling leading from 3026.

If the data is determined to be a query, then a property may be used to determine the appropriate type of information. Queries may ask for various information, as illustrated at 3030, 3032 and 3034. The result is then serialized and sent back to the publish engine. The publish server also receives certain administration requests made by its clients, such as for status, as indicated at 3036, and stop the service, as indicated at 3038. These tasks can be invoked by administrators. The connection is closed when the information in response to the query has been provided, as indicated at 3040, and the publish server becomes available to accept socket connections again.

It will be understood that the foregoing architecture represents one system having means for carrying out the steps of the method of the invention. The visualization engine comprises means for presenting information to a user, means for prompting a user, and means for receiving requests from a user. The probe engine comprises means for obtaining information regarding distributed applications, and for carrying out filtered monitoring of the distributed applications. It will be understood that the functions of the publish engine, archive, database and kernel cooperate with the visualization engine and the probe engine to provide one means for carrying out the steps of the method.

General and Conclusion

The problem determination system of the invention may be installed through installation of certain probe software on a server to be monitored, and a separate server for the remaining software of the invention. This configuration provides for relatively straightforward installation of the system of the invention.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

While the exemplary embodiments have been described with respect to enterprise applications using Java technologies, and specifically J2EE technologies, the methods of the invention may be implemented in other technologies. For example, the methods of the invention may be implemented in other platform-independent technologies. The methods of the invention may also be implemented in other technologies applicable to distributed enterprise applications.

Although exemplary embodiments are described in detail above, the invention is not limited thereto. Rather, the invention should be construed broadly to include other variants and embodiments.

What is claimed is:

1. A system for problem determination for enterprise applications running in a distributed environment, comprising:
    means for obtaining information regarding the enterprise applications,
    means for presenting high level information of an application server groups level, comprising a plurality of first information items, selected from said obtained information in a format accessible to a user, wherein the high level information includes an indication of whether each server is available or unavailable and information of throughput of an application on each server group including information as to a number of completed requests, wherein availability or unavailability is measured by monitoring of requests processed by at least one application and by monitoring delta CPU usage, delta throughput volume, and delta memory usage attributable to the at least one application, wherein availability is based on availability of application software running on a server, wherein the information of throughput is used to identify trends,
    means for receiving a request from a user by selection of at least one of said first information items for more detailed information as to one or more of said first information items, wherein the selection selects an application,
    a monitor for displaying the requested more detailed information of an application server group level to the user in response to the request, comprising a plurality of second information items including information identifying each server and indicating CPU usage, a total number of completed requests, an incremental number of completed requests, and memory usage for the identified server for the selected application, wherein the plurality of second information items are used to determine a source of a problem,
    means for receiving another request from the user by selection of at least one of said second information items for still more detailed information at an application level, wherein the selection selects a server, and
    the monitor for displaying said still more detailed information comprising information on a thread-by-thread basis as to at least one of said servers, wherein each thread is being executed by a server at a particular point in time, wherein the information on a thread includes information relating to speed of execution of the thread and to use of system resources by the thread, wherein information relating to the speed of execution is used to determine whether that thread is executing, and wherein the information relating to use of the system resources is used to determine whether that thread is preventing other threads from gaining access to the system resources.

2. The system of claim 1, wherein said means for presenting high level information comprises means for presenting information about application performance on a plurality of servers.

3. The system of claim 2, wherein the application performance information comprises information as to the number of completed requests over a plurality of recent time periods.

4. The system of claim 1, wherein said means for providing more detailed information comprises displaying concurrently information concerning use by one application of each of a plurality of servers.

5. The system of claim 4, wherein the provided information comprises use of CPU of each server by the selected application.

6. The system of claim 1, wherein said information on a thread-by-thread basis comprises information as to a client request identifying each thread.

7. The system of claim 1, further comprising means for providing a filter having one or more criteria and selectively displaying only those of said threads meeting said criteria.

8. The system of claim 7, wherein said criteria comprise at least one request type.

9. The system of claim 1, further comprising means for presenting still more detailed information with respect to a selected thread.

10. The system of claim 9, wherein said still more detailed information with respect to a selected thread comprises an execution history in terms of a method trace of a request being processed by the selected thread.

11. The system of claim 10, further comprising providing a list of method calls.

12. A computer program for problem determination for enterprise applications running in a distributed environment, said program consisting of instructions stored on a non-transitory machine-readable storage medium, said instructions, when executed on a processor causing the processor to execute:

presenting high level information of an application server groups level, comprising a plurality of first information items, selected from said obtained information in a format accessible to a user, wherein the high level information includes an indication of whether each server is available or unavailable and information of throughput of an application on each server group including information as to a number of completed requests, wherein availability or unavailability is measured by monitoring of requests processed by at least one application and by monitoring delta CPU usage, delta throughput volume, and delta memory usage attributable to the at least one application, wherein availability is based on availability of application software running on a server, wherein the information of throughput is used to identify trends, receiving a request from a user by selection of at least one of said first information items for more detailed information as to one or more of said first information items, wherein the selection selects an application, displaying the requested more detailed information of an application server group level to the user in response to the request, comprising a plurality of second information items including information identifying each server and indicating CPU usage, a total number of completed requests, an incremental number of completed requests, and memory usage for the identified server for the selected application, wherein the plurality of second information items are used to determine a source of a problem, receiving another request from the user by selection of at least one of said second information items for still more detailed information at an application level, wherein the selection selects a server, and displaying said still more detailed information comprising information on a thread-by-thread basis as to at least one of said servers, wherein each thread is being executed by a server at a particular point in time, wherein the information on a thread includes information relating to speed of execution of the thread and to use of system resources by the thread, wherein information relating to the speed of execution is used to determine whether that thread is executing, and wherein the information relating to use of the system resources is used to determine whether that thread is preventing other threads from gaining access to the system resources.

13. The computer program of claim 12, wherein presenting high level information comprises presenting information about application performance on a plurality of servers.

14. The computer program of claim 13, wherein the application performance information comprises information as to the number of completed requests over a plurality of recent time periods.

15. The computer program of claim 12, wherein providing more detailed information comprises displaying concurrently information concerning use by one application of each of a plurality of servers.

16. The computer program of claim 15, wherein the provided information comprises use of CPU of each server by the selected application.

17. The computer program of claim 12, wherein said information on a thread-by-thread basis comprises information as to a client request identifying each thread.

18. The computer program of claim 12, further comprising providing a filter having one or more criteria and selectively displaying only those of said threads meeting said criteria.

19. The computer program of claim 18, wherein said criteria comprise at least one request type.

20. The computer program of claim 18, further comprising providing still more detailed information with respect to a selected thread.

21. The computer program of claim 20, wherein said still more detailed information with respect to a selected thread comprises an execution history in terms of a computer program trace of a request being processed by the selected thread.

22. The computer program of claim 16, further comprising providing a list of computer program calls.

* * * * *